US011159652B2

(12) United States Patent
Branch

(10) Patent No.: US 11,159,652 B2
(45) Date of Patent: Oct. 26, 2021

(54) TRANSMISSION CONTROL PROTOCOL (TCP) INTERMEDIATE DEVICE IMPLEMENTING A TCP FAST OPEN (TFO) CONNECTION

(71) Applicant: CLOUDFLARE, INC., San Francisco, CA (US)

(72) Inventor: Christopher Philip Branch, Romford (GB)

(73) Assignee: CLOUDFLARE, INC., San Francisco, CA (US)

( * ) Notice: Subject to any disclaimer, the term of this patent is extended or adjusted under 35 U.S.C. 154(b) by 0 days.

(21) Appl. No.: 17/138,410

(22) Filed: Dec. 30, 2020

(65) Prior Publication Data

US 2021/0203760 A1 Jul. 1, 2021

Related U.S. Application Data

(60) Provisional application No. 62/956,117, filed on Dec. 31, 2019.

(51) Int. Cl.
*H04L 29/06* (2006.01)
*H04L 29/08* (2006.01)

(52) U.S. Cl.
CPC .......... *H04L 69/163* (2013.01); *H04L 63/126* (2013.01); *H04L 67/28* (2013.01); *H04L 69/166* (2013.01)

(58) Field of Classification Search
CPC ....... G06F 9/4416; G06F 13/00; H04L 29/06; H04L 29/08; H04L 29/0809;

(Continued)

(56) References Cited

U.S. PATENT DOCUMENTS 8,806,011 B1 8/2014 Graham-Cumming
9,148,383 B2 9/2015 Agrawal et al.
(Continued)

OTHER PUBLICATIONS

Transmission Control Protocol, DARPA Internet Program Protocol Specification, RFC 793, prepared for Defense Advanced Research Projects Agency Information Processing Techniques Office, by Information Sciences Institute University of Southern California, Sep. 1981, 89 pages.

(Continued)

*Primary Examiner* — Robert B Harrell
(74) *Attorney, Agent, or Firm* — Nicholson De Vos Webster & Elliott LLP

(57) ABSTRACT

A TCP intermediate device receives a SYN packet from a TCP client that is destined for a TCP origin server and indicates support for TCP fast open (TFO). A SYN-ACK packet is transmitted to the TCP client that includes a TFO cookie set by the TCP intermediate device. The TCP intermediate device receives a first ACK packet from the TCP client. A SYN packet is sent to the TCP origin server and a second SYN-ACK packet is received in response that does not indicate support for TFO. An ACK packet to the TCP origin server. Sometime after the TCP connection is completed, the TCP intermediate device receives a SYN packet from the TCP client that includes the TFO cookie and a payload of data. The TCP intermediate device establishes a TCP connection with the TCP origin server and transmits the payload of data to the TCP origin server.

18 Claims, 15 Drawing Sheets

(58) Field of Classification Search
CPC ......... H04L 29/06068; H04L 29/06095; H04L 29/08072; H04L 29/08981; H04L 41/0806; H04L 63/08; H04L 63/20; H04L 63/29; H04L 63/83; H04L 63/281; H04L 63/428; H04L 63/807; H04L 63/853; H04L 67/00; H04L 67/02; H04L 67/28; H04L 67/42; H04L 67/2814; H04L 69/163; H04L 69/168; H04L 69/326; H04L 63/126; H04L 69/166
USPC .................................. 709/222, 230; 726/12
See application file for complete search history.

(56) References Cited

U.S. PATENT DOCUMENTS

| | | |
|---|---|---|
| 9,749,354 B1 | 8/2017 | Diggins et al. |
| 10,038,693 B2 | 7/2018 | Jalan et al. |
| 2003/0135625 A1 | 7/2003 | Fontes et al. |
| 2007/0233877 A1 | 10/2007 | Qu et al. |
| 2013/0263245 A1 | 10/2013 | Sun et al. |
| 2014/0330976 A1 | 11/2014 | Van Bemmel |
| 2015/0171962 A1 | 6/2015 | Archer et al. |
| 2015/0215277 A1 | 7/2015 | Heo |
| 2016/0197823 A1 | 7/2016 | Sreeramoju |
| 2018/0302434 A1 | 10/2018 | Ma et al. |
| 2019/0028559 A1* | 1/2019 | Sampat ............... H04L 67/2814 |
| 2019/0320046 A1 | 10/2019 | Bifulco et al. |
| 2020/0162432 A1* | 5/2020 | Ludin .................... H04L 63/20 |
| 2020/0304606 A1 | 9/2020 | Tourrilhes et al. |

OTHER PUBLICATIONS

Cheng et al, Internet Engineering Task Force (IETF), TCP Fast Open, RFC 7413, Dec. 2014, 26 pages.

Non-Final Office Action, U.S. Appl. No. 17/138,396, dated Jul. 28, 2021, 9 pages.

* cited by examiner

```
┌─────────────────────────────────────────────────────────────────────┐
│ RECEIVE A FIRST SYN PACKET FROM A TCP CLIENT THAT IS A FIRST INITIAL│
│ MESSAGE TO ESTABLISH A FIRST TCP CONNECTION BETWEEN THE TCP CLIENT  │
│ AND A TCP ORIGIN SERVER, THE FIRST SYN PACKET INDICATING TFO        │
│ SUPPORT 610                                                         │
└─────────────────────────────────────────────────────────────────────┘
                                  ↓
┌─────────────────────────────────────────────────────────────────────┐
│ TRANSMIT A FIRST SYN-ACK PACKET TO THE TCP CLIENT, THE FIRST        │
│ SYN-ACK PACKET INCLUDING A TFO COOKIE 615                           │
└─────────────────────────────────────────────────────────────────────┘
                                  ↓
┌─────────────────────────────────────────────────────────────────────┐
│ RECEIVE A FIRST ACK PACKET FROM THE TCP CLIENT 620                  │
└─────────────────────────────────────────────────────────────────────┘
                                  ↓
┌─────────────────────────────────────────────────────────────────────┐
│ TRANSMIT A SECOND SYN PACKET THAT IS A SECOND INITIAL MESSAGE TO    │
│ ESTABLISH A SECOND TCP CONNECTION BETWEEN THE TCP INTERMEDIATE      │
│ SERVER AND THE TCP ORIGIN SERVER, THE SECOND SYN PACKET INDICATING  │
│ TFO SUPPORT 625                                                     │
└─────────────────────────────────────────────────────────────────────┘
                                  ↓
┌─────────────────────────────────────────────────────────────────────┐
│ RECEIVE A SECOND SYN-ACK PACKET FROM THE TCP ORIGIN SERVER, THE     │
│ SECOND SYN-ACK PACKET DOES NOT INDICATE TFO SUPPORT 630             │
└─────────────────────────────────────────────────────────────────────┘
                                  ↓
┌─────────────────────────────────────────────────────────────────────┐
│ TRANSMIT A SECOND ACK PACKET TO THE TCP ORIGIN SERVER 635           │
└─────────────────────────────────────────────────────────────────────┘

TCP Connection Ends
- - - - - - - - - - - - - - - - - - - - - - - - - - - - - - - - - - -
                                  ↓
┌─────────────────────────────────────────────────────────────────────┐
│ RECEIVE A THIRD SYN PACKET FROM THE CLIENT DEVICE THAT INCLUDES THE │
│ TFO COOKE AND PAYLOAD 640                                           │
└─────────────────────────────────────────────────────────────────────┘
                                  ↓
┌─────────────────────────────────────────────────────────────────────┐
│ VALIDATE THE TFO COOKIE 645                                         │
└─────────────────────────────────────────────────────────────────────┘
                                  ↓
┌─────────────────────────────────────────────────────────────────────┐
│ TRANSMIT A FOURTH SYN PACKET TO THE TCP ORIGIN SERVER 650           │
└─────────────────────────────────────────────────────────────────────┘
                                  ↓
┌─────────────────────────────────────────────────────────────────────┐
│ RECEIVE A THIRD SYN-ACK PACKET FROM THE TCP ORIGIN SEVER 655        │
└─────────────────────────────────────────────────────────────────────┘
                                  ↓
┌─────────────────────────────────────────────────────────────────────┐
│ TRANSMIT A THIRD ACK PACKET TO THE TCP ORIGIN SERVER 660            │
└─────────────────────────────────────────────────────────────────────┘
                                  ↓
┌─────────────────────────────────────────────────────────────────────┐
│ TRANSMIT A FOURTH ACK PACKET TO THE TCP ORIGIN SERVER THAT INCLUDES │
│ THE PAYLOAD DATA 665                                                │
└─────────────────────────────────────────────────────────────────────┘
```

FIG. 6

```
┌─────────────────────────────────────────────────────────────────────┐
│ RECEIVE A FIRST SYN PACKET FROM A TCP CLIENT THAT IS A FIRST INITIAL│
│ MESSAGE TO ESTABLISH A FIRST TCP CONNECTION BETWEEN THE TCP CLIENT  │
│ AND A TCP ORIGIN SERVER, THE FIRST SYN PACKET INDICATING TFO        │
│ SUPPORT 810                                                         │
└─────────────────────────────────────────────────────────────────────┘
                                   ↓
┌─────────────────────────────────────────────────────────────────────┐
│ TRANSMIT A FIRST SYN-ACK PACKET TO THE TCP CLIENT, THE FIRST        │
│ SYN-ACK PACKET INCLUDING A TFO COOKIE 815                           │
└─────────────────────────────────────────────────────────────────────┘
                                   ↓
┌─────────────────────────────────────────────────────────────────────┐
│ RECEIVE A FIRST ACK PACKET FROM THE TCP CLIENT 820                  │
└─────────────────────────────────────────────────────────────────────┘
                                   ↓
┌─────────────────────────────────────────────────────────────────────┐
│ TRANSMIT A SECOND SYN PACKET THAT IS A SECOND INITIAL MESSAGE TO    │
│ ESTABLISH A SECOND TCP CONNECTION BETWEEN THE TCP INTERMEDIATE      │
│ SERVER AND THE TCP ORIGIN SERVER, THE SECOND SYN PACKET INDICATING  │
│ TFO SUPPORT 825                                                     │
└─────────────────────────────────────────────────────────────────────┘
                                   ↓
┌─────────────────────────────────────────────────────────────────────┐
│ RECEIVE A SECOND SYN-ACK PACKET FROM THE TCP ORIGIN SERVER, THE     │
│ SECOND SYN-ACK PACKET INCLUDING A SECOND TFO COOKIE 830             │
└─────────────────────────────────────────────────────────────────────┘
                                   ↓
┌─────────────────────────────────────────────────────────────────────┐
│ TRANSMIT A SECOND ACK PACKET TO THE TCP ORIGIN SERVER 835           │
└─────────────────────────────────────────────────────────────────────┘

TCP Connection Ends
- - - - - - - - - - - - - - - - - ↓ - - - - - - - - - - - - - - - - -

┌─────────────────────────────────────────────────────────────────────┐
│ RECEIVE A THIRD SYN PACKET FROM THE CLIENT DEVICE THAT INCLUDES THE │
│ TFO COOKE AND PAYLOAD 840                                           │
└─────────────────────────────────────────────────────────────────────┘
                                   ↓
┌─────────────────────────────────────────────────────────────────────┐
│ VALIDATE THE TFO COOKIE 845                                         │
└─────────────────────────────────────────────────────────────────────┘
                                   ↓
┌─────────────────────────────────────────────────────────────────────┐
│ MODIFY THE THIRD SYN PACKET TO SWAP THE TFO COOKIE WITH THE SECOND  │
│ TFO COOKIE RECEIVED IN THE SECOND SYN-ACK PACKET 850                │
└─────────────────────────────────────────────────────────────────────┘
                                   ↓
┌─────────────────────────────────────────────────────────────────────┐
│ TRANSMIT A FOURTH SYN PACKET TO THE TCP ORIGIN SERVER THAT INCLUDES │
│ THE SECOND TFO COOKIE INSTEAD OF THE TFO COOKIE RECEIVED FROM THE   │
│ CLIENT DEVICE 855                                                   │
└─────────────────────────────────────────────────────────────────────┘
```

FIG. 8

```
┌─────────────────────────────────────────────────────────────────────┐
│ RECEIVE A FIRST SYN PACKET FROM A TCP CLIENT THAT IS A FIRST INITIAL│
│ MESSAGE TO ESTABLISH A FIRST TCP CONNECTION BETWEEN THE TCP CLIENT  │
│ AND A TCP ORIGIN SERVER, THE FIRST SYN PACKET INDICATING TFO        │
│ SUPPORT 1210                                                        │
└─────────────────────────────────────────────────────────────────────┘
                                  ↓
┌─────────────────────────────────────────────────────────────────────┐
│ PRIOR TO A SECOND TCP CONNECTION BEING ESTABLISHED BETWEEN THE TCP  │
│ CLIENT AND THE TCP INTERMEDIATE DEVICE, TRANSMIT A SECOND SYN       │
│ PACKET TO THE TCP ORIGIN SERVER TO ESTABLISH A THIRD TCP CONNECTION │
│ BETWEEN THE TCP INTERMEDIATE DEVICE AND THE TCP ORIGIN SERVER, THE  │
│ SECOND SYN PACKET INDICATING TFO SUPPORT 1215                       │
└─────────────────────────────────────────────────────────────────────┘
                                  ↓
┌─────────────────────────────────────────────────────────────────────┐
│ TRANSMIT A FIRST SYN-ACK PACKET TO THE TCP CLIENT THAT INCLUDES A   │
│ FIRST TFO COOKIE 1220                                               │
└─────────────────────────────────────────────────────────────────────┘
                                  ↓
┌─────────────────────────────────────────────────────────────────────┐
│ RECEIVE A FIRST ACK PACKET FROM THE TCP CLIENT 1225                 │
└─────────────────────────────────────────────────────────────────────┘
                                  ↓
┌─────────────────────────────────────────────────────────────────────┐
│ RECEIVE A SECOND SYN-ACK PACKET FROM THE TCP ORIGIN SERVER THAT     │
│ INCLUDES A SECOND TFO COOKIE 1230                                   │
└─────────────────────────────────────────────────────────────────────┘
                                  ↓
┌─────────────────────────────────────────────────────────────────────┐
│ TRANSMIT A SECOND ACK PACKET TO THE TCP ORIGIN SERVER 1235          │
└─────────────────────────────────────────────────────────────────────┘

TCP Connection Ends
- - - - - - - - - - - - - - - - - - - - - - - - - - - - - - - - - -
                                  ↓
┌─────────────────────────────────────────────────────────────────────┐
│ RECEIVE A THIRD SYN PACKET FROM THE CLIENT DEVICE THAT INCLUDES THE │
│ TFO COOKE AND PAYLOAD 1240                                          │
└─────────────────────────────────────────────────────────────────────┘
                                  ↓
┌─────────────────────────────────────────────────────────────────────┐
│ VALIDATE THE TFO COOKIE 1245                                        │
└─────────────────────────────────────────────────────────────────────┘
                                  ↓
┌─────────────────────────────────────────────────────────────────────┐
│ MODIFY THE THIRD SYN PACKET TO SWAP THE TFO COOKIE WITH THE SECOND  │
│ TFO COOKIE RECEIVED IN THE SECOND SYN-ACK PACKET 1250               │
└─────────────────────────────────────────────────────────────────────┘
                                  ↓
┌─────────────────────────────────────────────────────────────────────┐
│ TRANSMIT A FOURTH SYN PACKET TO THE TCP ORIGIN SERVER THAT INCLUDES │
│ THE SECOND TFO COOKIE INSTEAD OF THE TFO COOKIE RECEIVED FROM THE   │
│ CLIENT DEVICE 1255                                                  │
└─────────────────────────────────────────────────────────────────────┘
```

FIG. 12

TRANSMISSION CONTROL PROTOCOL (TCP) INTERMEDIATE DEVICE IMPLEMENTING A TCP FAST OPEN (TFO) CONNECTION

CROSS-REFERENCE TO RELATED APPLICATIONS

This application claims the benefit of U.S. Provisional Application No. 62/956,117, filed Dec. 31, 2019, which is hereby incorporated by reference.

FIELD

Embodiments of the invention relate to the field of networking; and more specifically to transparent proxy conversion of Transmission Control Protocol (TCP) Fast Open connection.

BACKGROUND

TCP, defined for example in RFC 793, is a widely used protocol of the Internet that allows for reliable and ordered delivery of data. For example, web browsers commonly use TCP when connecting to origin servers on the Internet. The TCP segment (sometimes referred to as a TCP packet) includes a header that includes several fields including source port, destination port, sequence number, acknowledgement number, data offset, reserved, control bits, window, checksum, urgent pointer, options, padding, and a field for the data. The TCP segment is commonly encapsulated into an IP packet whose header includes several fields including among others source IP address, destination IP address, and options.

A client establishes a TCP connection with a server though a series of messages commonly referred to as a handshake. The handshake includes the client transmitting a TCP SYN message to the server which initiates a TCP connection to the server. The server responds with a TCP SYN-ACK message which acknowledges the TCP SYN message and sets an initial sequence number (ISN) to a value chosen by the server. The client responds with a TCP ACK message that acknowledges the TCP SYN-ACK message and includes an acknowledgement number that is the ISN incremented by one. After these three messages, the TCP connection between the client and the server is established.

A client may connect to the origin server via an intermediate server such as a proxy server. This intermediate server may split the connection into two distinct connections; one between the client and the intermediate server, and one between the intermediate server and the origin server. Typically, when a new connection between the intermediate server and the origin server is required in response to a request from a client, that connection is not established until at least the connection between the client and the intermediate server has been established with the handshake protocol. This handshake protocol guarantees that the connection was initiated by the client and not another party impersonating the client.

TCP Fast Open, described in RFC 7413 (December 2014), is an experimental update to TCP that enables data to be carried in the SYN and SYN-ACK packets as a way to save up to one full round-trip time (RTT) as compared to the standard three-way handshake. In TCP Fast Open (TFO), a TFO cookie is stored on the client upon the initial connection with a TCP server and if the client later reconnects, the initial SYN packet is sent with the TFO cookie which is used by the TCP server for authentication. If authenticated, the TCP server may start sending data to the TCP client before the reception of the final ACK packet of the three-way handshake.

BRIEF DESCRIPTION OF THE DRAWINGS

The invention may best be understood by referring to the following description and accompanying drawings that are used to illustrate embodiments of the invention. In the drawings:

FIG. 6 is a flow is a flow diagram that illustrates implementing a TCP Fast Open (TFO) connection between a TCP client and a TCP origin server according to an embodiment.

FIG. 8 is a flow is a flow diagram that illustrates implementing a TCP Fast Open (TFO) connection between a TCP client and a TCP origin server according to an embodiment.

FIG. 12 is a flow diagram that illustrates implementing a TCP Fast Open (TFO) connection between a TCP client and a TCP origin server according to an embodiment.

DESCRIPTION OF EMBODIMENTS

Figure 1:
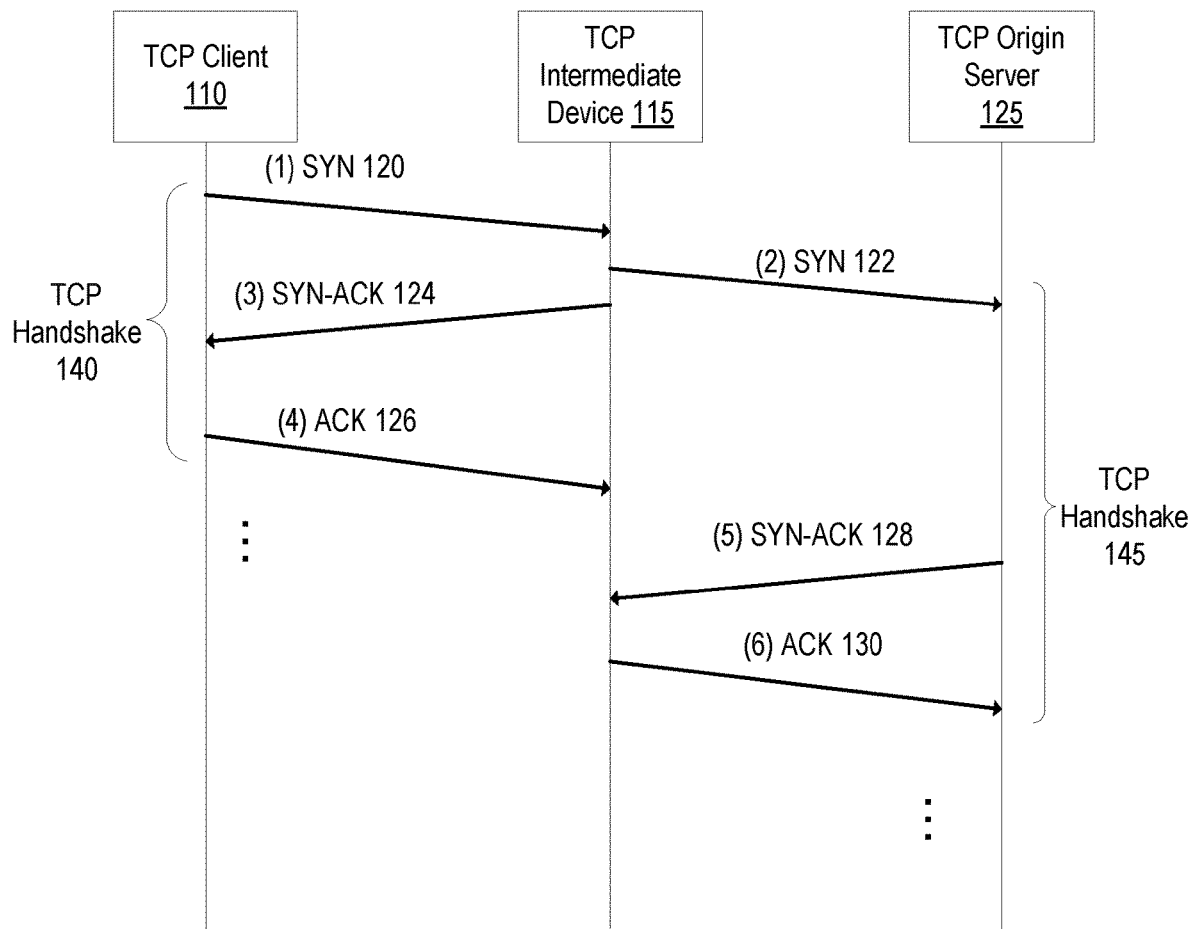
FIG. 1 is a sequence diagram that illustrates exemplary operations for an opportunistic TCP connection establishment according to an embodiment.

In an embodiment, a method and apparatus for an opportunistic Transmission Control Protocol (TCP) connection establishment by an intermediate device is described. The intermediate device sits between a TCP client and a TCP server. The TCP server is referred herein as the origin TCP server. The intermediate device splits the TCP connection to the origin TCP server into two connections; a first connection between the TCP client and the intermediate device, and a second connection between the intermediate device and the origin TCP server. In conventional implementations, the second connection between the intermediate device and the origin TCP server is not established until at least the first connection between the TCP client and the intermediate device is established, which guarantees that the first connection was initiated by the TCP client and not another party impersonating the TCP client However, in implementations described herein, the intermediate device acts upon the initiating message of the connection handshake from the TCP client (e.g., the initial SYN message from the TCP client) and without waiting for the completion of the handshake with the TCP client, the intermediate device opportunistically initiates the second connection between the intermediate device and the origin TCP server with an assumption that the first connection will be completed. This allows the first and second connections to be completed substantially at the same time. This may improve the time to first byte (TTFB).

In an embodiment, the intermediate device is a transparent proxy device that intercepts packets between the TCP client and the TCP origin server without the knowledge of the TCP client. That is, the transparent proxy device acts as if it is the TCP origin server to the TCP client. The transparent TCP proxy does not implement a TCP state machine in some embodiments. Thus, the transparent TCP proxy does not terminate the TCP connections. Instead, the transparent TCP proxy passes packets between the TCP client and the TCP server and updates the sequence number or acknowledgement number as appropriate and updates the TCP checksum as appropriate.

In an embodiment, the intermediate device determines whether to perform this concurrent connection behavior based on one or more attributes including: the address of the TCP client, the network and/or path taken by packets from the client (e.g., whether traffic is received on a trusted interface or an authenticated IP tunnel), the number of initiated but not yet established connections made by TCP clients and/or TCP origins either in total or on an individual basis, and the amount of resources available or used of the intermediate device.

In an embodiment, a method and apparatus for a TCP intermediate device implementing a TCP Fast Open (TFO) connection between a TCP client and a TCP origin server is described. The TCP intermediate device may be a transparent proxy that allows the client to send data during a TCP connection handshake (e.g., a TCP Fast Open) regardless of whether the TCP origin server supports TFO. The initial time a TCP client connects to a TCP origin server, the TCP client requests the ability to use TFO and the TCP intermediate device passes the first part of the TCP handshake unmodified to the TCP origin server. If the TCP origin server response indicates support for TFO, the TCP intermediate device continues to forward packets between the TCP client and the TCP origin server for the duration of the connection. However, if the TCP origin server response indicates that it does not support TFO, the TCP intermediate device modifies the response to indicate TFO support and stores an identifier and associates it with the TCP origin server. All other packets for this connection are passed unmodified. The next time the TCP client attempts to connect to the TCP origin server, the TCP client indicates use of TFO and includes the previously given identifier. The intermediate TCP device verifies that the identifier is authentic and if so, the TCP intermediate device generates a regular three-way TCP handshake with the TCP origin server and sends the data received by the TCP client to the TCP origin server once the handshake has completed. Thus, it appears to the TCP client as if the TCP origin server supports TFO even though it does not.

FIG. 1 is a sequence diagram that illustrates exemplary operations for an opportunistic TCP connection establishment according to an embodiment. The sequence diagram of FIG. 1 includes the TCP client 110, the TCP intermediate device 115, and the TCP origin server 125. The TCP client 110 may be any client network application that initiates a TCP connection with a server. For example, the client network application may be an Internet browser executing on a client device, a native application executing on a client device, or any other application that implements TCP. The TCP origin server 125 may be a network server and may or may not be an origin server that maintains web pages.

The TCP intermediate device 115 is situated between the TCP client 110 and the TCP origin server 125 and receives at least certain TCP packets as will be described. The TCP intermediate device 115 splits a TCP connection from the TCP client 110 to the TCP origin server 125 into two connections; a first connection between the TCP client 110 and the TCP intermediate device 115, and a second connection between the TCP intermediate device 115 and the TCP origin server 125. As shown in FIG. 1, a first TCP handshake 140 is made between the TCP client 110 and the TCP intermediate device 115 to establish the first TCP connection; and a second TCP handshake 145 is made between the TCP intermediate device 115 and the TCP origin server 125 to establish the second TCP connection.

The TCP intermediate device 115 acts upon the initiating message of the TCP handshake 140 and without waiting for the completion of the TCP handshake 140, opportunistically initiates the TCP handshake 145 with the TCP origin server 125. At operation 1, the TCP intermediate device 115 receives a SYN packet 120 from the TCP client 110 at an interface coupling the TCP client 110 and the TCP intermediate device 115. The SYN packet 120 is destined for the TCP origin server 125 and is transmitted by the TCP client 110 to initiate a TCP connection to the TCP origin server 125. The SYN packet 120 includes as its destination IP address an IP address of the TCP origin server 125.

In an embodiment, the TCP intermediate device 115 performs the opportunistic TCP connection process only when the initiating message is addressed to the TCP origin server 125 (and not addressed to the TCP intermediate device 115). The TCP intermediate device 115 may examine the destination IP packet and protocol type in the IP header and check whether the SYN flag in the TCP header is set (and the ACK, FIN, RST, and PHS flags are unset) when determining whether the initiating message is a SYN packet addressed to the TCP origin server 125.

In an embodiment, the TCP intermediate device 115 determines whether to perform the opportunistic TCP connection described herein. The TCP intermediate device 115 may determine whether to perform the opportunistic TCP connection based on one or more of the following attributes including: the address of the TCP client 110, the network and/or path taken by packets from the TCP client 110 (e.g., whether traffic is received on a trusted interface or an authenticated IP tunnel), the number of initiated but not yet established connections made by the TCP client 110 and/or destined for the TCP origin server 125 either in total or an individual basis, and the amount of resources available or used of the TCP intermediate device 115.

By way of example, the TCP intermediate device 115 may be configured to perform opportunistic TCP connection establishment only if the SYN packet 120 is received on a trusted interface or an authenticated IP tunnel. Additionally, or alternatively, the TCP intermediate device 115 may determine the number of initiated TCP connections but not yet established connections made by the TCP client 110 and/or destined for the TCP origin server 125 either in total or an individual basis and perform opportunistic TCP connection establishment only if below a threshold. Additionally, or alternatively, the TCP intermediate device 115 may perform the opportunistic TCP connection establishment only if the amount of resources available on the TCP intermediate device 115 is over a threshold.

After receiving the SYN packet 120 from the TCP client 110 and without waiting for the completion of the TCP handshake 140, the TCP intermediate device 115 initiates the TCP handshake 145 with the TCP origin server 125. Thus, at operation 2, the TCP intermediate device 115 transmits a SYN packet 122 to the TCP origin server 125 to initiate the TCP handshake 145.

At operation 3, the TCP intermediate device 115 transmits a SYN-ACK packet 124 to the TCP client 110 as part of the TCP handshake 140. The SYN-ACK packet 124 appears to be from the TCP origin server 125 (e.g., it includes as its source IP address the IP address of the TCP origin server 125 which was the destination IP address in the SYN packet 120). Thus, it appears to the TCP client 110 as if the TCP origin server 125 transmitted the SYN-ACK packet 124.

In response to the SYN-ACK packet 124, the TCP intermediate device 115 receives an ACK packet 126 from the TCP client 110 at operation 4. The ACK packet 126 is the final packet in the three-way TCP handshake 140. Thus, after receiving and processing the ACK packet 126, a first TCP connection is established between the TCP client 110 and the TCP intermediate device 115.

At operation 5, the TCP intermediate device 115 receives a SYN-ACK packet 128 from the TCP origin server 125 in response to the SYN packet 122 as part of the TCP handshake 145. In response to the SYN-ACK packet, the TCP intermediate device 115 transmits the ACK packet 130 to the TCP origin server 125 at operation 6. The ACK packet 130 is the final packet in the three-way TCP handshake 145. Thus, after receiving and processing the ACK packet 130, a second TCP connection is established between the TCP intermediate device 115 and the TCP origin server 125.

Although FIG. 1 illustrates the packets being sent and received in a particular order, the packets may be sent and received by the TCP intermediate device 115 in a different order while not waiting for the first TCP connection between the TCP client 110 and the TCP intermediate device 115 to complete. For instance, the TCP intermediate device 115 may transmit the SYN-ACK packet 124 before transmitting the SYN packet 122. As another example, the TCP intermediate device 115 may receive the SYN-ACK packet 128 prior to receiving the ACK packet 126.

Because the TCP intermediate device 115 does not wait until the first TCP connection with the TCP client is complete before initiating the second TCP connection with the TCP origin server, the second TCP connection is completed faster than in conventional implementations which may improve the time to first byte (TTFB).

Figure 2:
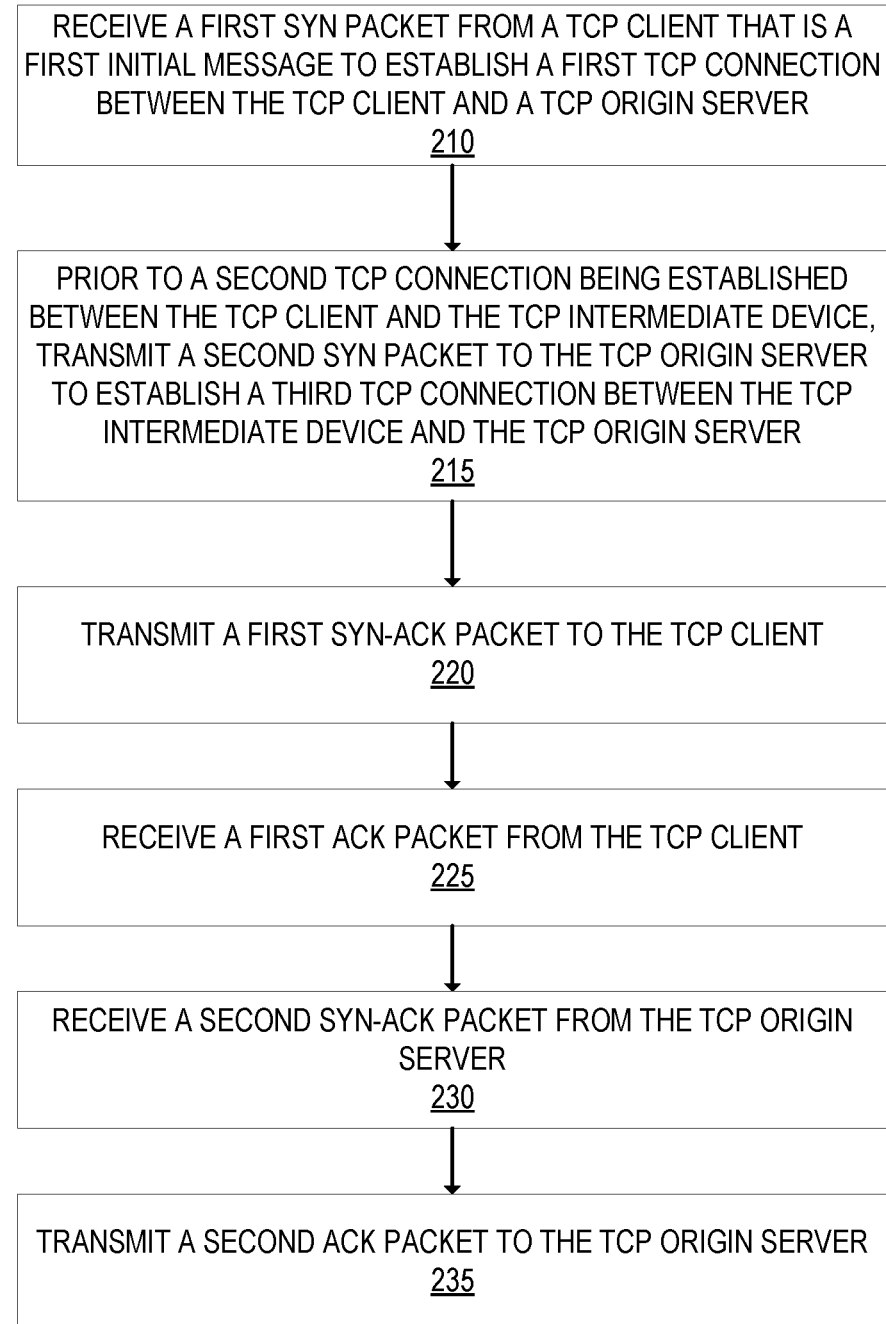
FIG. 2 is a flow diagram that illustrates exemplary operations for opportunistic TCP connection establishment according to an embodiment.

FIG. 2 is a flow diagram that illustrates exemplary operations for opportunistic TCP connection establishment according to an embodiment. The operations of FIG. 2 will be described with respect to the exemplary embodiment of FIG. 1. However, the operations of FIG. 2 can be performed by embodiments other than those discussed with reference to FIG. 1, and the embodiments discussed with reference to FIG. 1 can perform operations different than those discussed with reference to FIG. 2.

At operation 210, the TCP intermediate device 115 receives a first SYN packet from the TCP client 110. The first SYN packet is a first initial message to establish a first TCP connection between the TCP client 110 and the TCP origin server 125. The first SYN packet is addressed to the TCP origin server 125. The TCP intermediate device 115 splits the first TCP connection into two connections; a second connection between the TCP client 110 and the TCP intermediate device 115, and a third connection between the TCP intermediate device 115 and the TCP origin server 125.

Next, at operation 215, prior to the second TCP connection between being fully established (e.g., prior to the three-way handshake between the TCP client 110 and the TCP intermediate device 115 being complete), the TCP intermediate device 115 transmits a second SYN packet to the TCP origin server 125. The second SYN packet is a second initial message to establish a third TCP connection between the TCP intermediate device 115 and the TCP origin server 125.

Prior to operation 215, the TCP intermediate device 115 may determine that the first SYN packet is addressed to the TCP origin server 125. Prior to operation 215, the TCP intermediate device 115 may determine that the first SYN packet is received on a trusted interface or authenticated IP tunnel. If it was not received on a trusted interface or authenticated IP tunnel, the TCP intermediate device 115 may not perform the concurrent TCP connection establishment. Prior to operation 225, the TCP intermediate device 115 may determine that a number of number of TCP connection initiations received from the TCP client but a connection is not established does not exceed a threshold; if it exceeded the threshold, the TCP intermediate device 115 may not perform the concurrent TCP connection. Prior to operation 225, the TCP intermediate device 115 may determine that a number of TCP connection initiations to the TCP origin server where a TCP connection is not established does not exceed a threshold; if it exceeded the threshold, the TCP intermediate device 115 may not perform the concurrent TCP connection.

At operation 220, the TCP intermediate device 115 transmits a first SYN-ACK packet to the TCP client 110 as part of establishing the second TCP connection between the TCP client 110 and the TCP intermediate device 115. The SYN-ACK packet appears to be from the TCP origin server 125 (e.g., it includes as its source IP address the IP address of the TCP origin server 125 which was the destination IP address in the SYN packet received from the TCP client 110). Thus, it appears to the TCP client 110 as if the TCP origin server 125 transmitted the SYN-ACK packet.

Next, at operation 225, the TCP intermediate device 115 receives a first ACK packet from the TCP client 110 as part of establishing the second TCP connection between the TCP client 110 and the TCP intermediate device 115. The first ACK packet is the final packet in the three-way TCP handshake to establish the second TCP connection. Thus, the second TCP connection is established responsive to processing the first ACK packet from the TCP client 110.

Next, at operation 230, the TCP intermediate device receives a second SYN-ACK packet from the TCP origin server 125 as part of establishing the third TCP connection between the TCP intermediate device 115 and the TCP origin server 125. Next, at operation 235, the TCP intermediate device transmits a second ACK packet to the TCP origin server as part of establishing the third TCP connection. The second ACK packet is the final packet in the three-way TCP handshake to establish the third TCP connection. Thus, the third TCP connection is established response to processing second ACK packet.

Although FIG. 2 illustrates the packets being sent and received in a particular order, the packets may be sent and received by the TCP intermediate device 115 in a different order while not waiting for the first TCP connection between the TCP client 110 and the TCP intermediate device 115 to complete. For instance, the TCP intermediate device 115 may transmit the first SYN-ACK packet of operation 220 before transmitting the second SYN packet of operation 215. As another example, the TCP intermediate device 115 may receive the second SYN-ACK packet of operation 230 prior to receiving the first ACK packet of operation 225.

Figure 3:
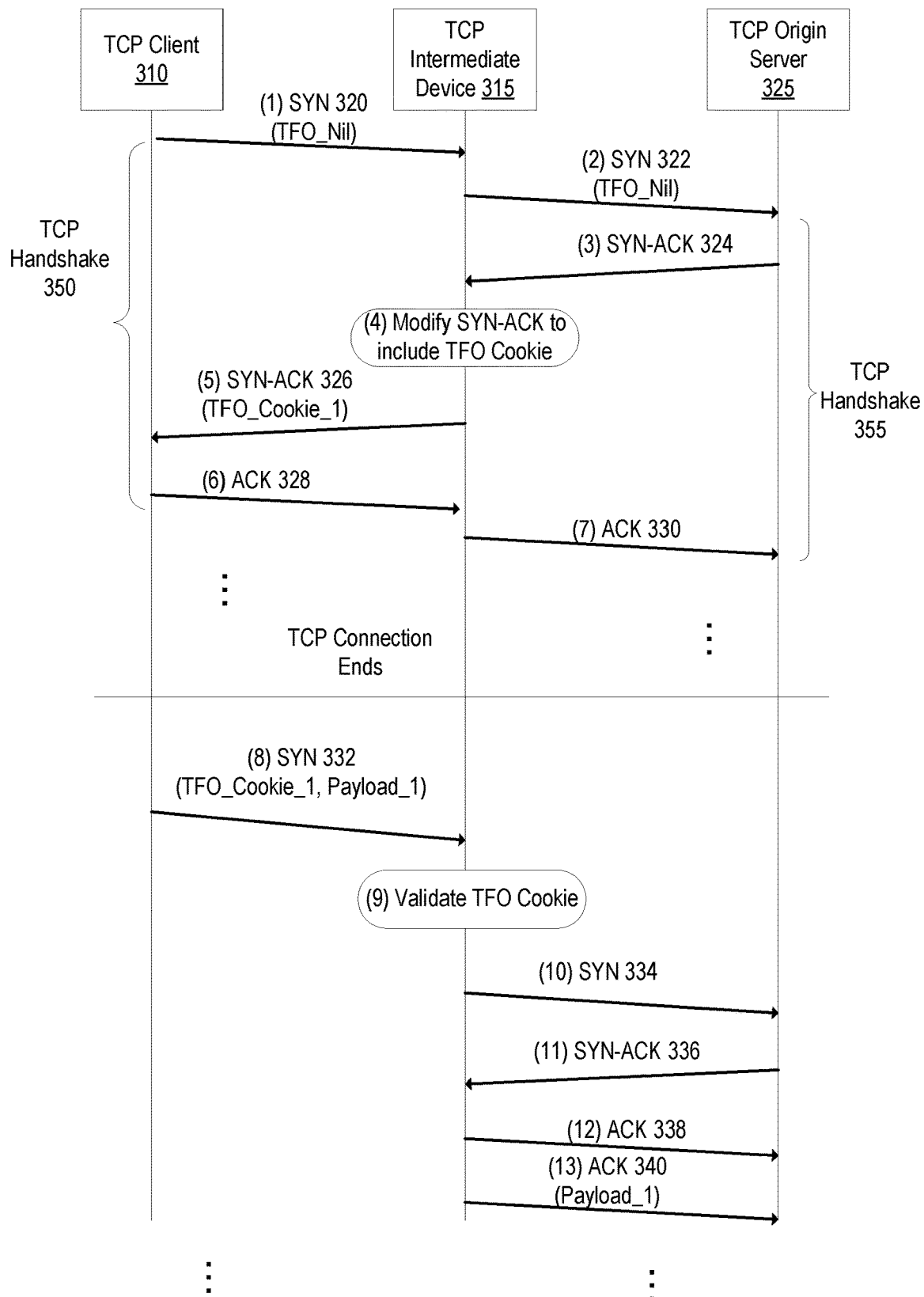
FIG. 3 is a sequence diagram that illustrates implementing a TCP Fast Open (TFO) connection between a TCP client and a TCP origin server according to an embodiment.

FIG. 3 is a sequence diagram that illustrates implementing a TCP Fast Open (TFO) connection between a TCP client and a TCP origin server according to an embodiment. The sequence diagram of FIG. 3 includes the TCP client 310, the TCP intermediate device 315, and the TCP origin server 325. The TCP client 310 may be any client network application that initiates a TCP connection with a server. For example, the client network application may be an Internet browser executing on a client device, a native application executing on a client device, or any other application that implements TCP. The TCP origin server 325 may be a network server and may or may not be an origin server that maintains web pages.

The TCP intermediate device 315 is situated between the TCP client 310 and the TCP origin server 325 and receives at least certain TCP packets as will be described. The TCP intermediate device 315 may be a transparent proxy that allows the TCP client 310 to send data during a TCP connection handshake (e.g., a TCP Fast Open) regardless of whether the TCP origin server 325 supports TFO. The initial time the TCP client 310 connects to the TCP origin server 325, the TCP client 310 requests the ability to use TFO and the TCP intermediate device 315 passes the first part of the TCP handshake unmodified to the TCP origin server 325. If the TCP origin server response indicates support for TFO, the TCP intermediate device 315 continues to forward packets between the TCP client 310 and the TCP origin server 325 for the duration of the connection. However, if the TCP origin server response indicates that it does not support TFO, the TCP intermediate device 315 modifies the response to indicate TFO support and stores an identifier and associates it with the TCP origin server 325. All other packets for this connection are passed unmodified. The next time the TCP client 310 attempts to connect to the TCP origin server 325, the TCP client 310 indicates use of TFO and includes the previously given identifier. The TCP intermediate device 315 verifies that the identifier is authentic and if so, the TCP intermediate device 315 generates a regular three-way TCP handshake with the TCP origin server 325 and sends the data received by the TCP client 310 to the TCP origin server 325 once the handshake has completed. Thus, it appears to the TCP client 310 as if the TCP origin server 325 supports TFO even though it does not.

The TCP intermediate device 315 receives, at operation 1, the SYN packet 320 at an interface coupling the TCP client 310 and the TCP intermediate device 315. The SYN packet 320 is destined for the TCP origin server 325 and is transmitted by the TCP client 310 to initiate a TCP connection to the TCP origin server 325. The SYN packet 320 includes as its destination IP address an IP address of the TCP origin server 325. The SYN packet 320 includes an indication that it supports TFO. For instance, the SYN packet may include a fast open cookie that has no value or a null value for the client to indicate to the server that it supports TFO.

At operation 2, the TCP intermediate device 315 transmits the SYN packet 322 to the TCP origin server 325 to initiate the TCP handshake 355. The SYN packet 322 includes an indication that TFO is supported. For instance, the SYN packet 322 may include a fast open cookie that has no value or a null value.

In the example shown in FIG. 3, the TCP origin server 325 does not support TFO. In response to the SYN packet 322, the TCP intermediate device 315 receives the SYN-ACK packet 324 from the TCP origin server 325 at operation 3, and the SYN-ACK packet 324 does not include a fast open cookie. At operation 4, the TCP intermediate device 315 modifies the SYN-ACK packet to include a fast open cookie. The TCP intermediate device 315 may also store an identifier and associate it with the TCP origin server 325. This allows the TCP intermediate device 315 to store data indicating that the TCP origin server 325 does not support TFO. The identifier may be unique and based on the connecting TCP client 310 (e.g., one or more of the attributes of the connecting TCP client 310). At operation 5, the TCP intermediate device 315 transmits the SYN-ACK packet 326 to the TCP client 310 that includes a TFO cookie. From the perspective of the TCP client 310, it appears that the TCP origin server supports TFO even though it does not.

In response to the SYN-ACK packet 326, the TCP intermediate device 315 receives an ACK packet 328 from the TCP client 310 at operation 6. The ACK packet 328 is the final packet in the three-way TCP handshake 350. Thus, after receiving and processing the ACK packet 328, a first TCP connection is established between the TCP client 310 and the TCP intermediate device 315. Next, at operation 7, the TCP intermediate device 315 transmits the ACK packet 330 to the TCP origin server 325. The ACK packet 330 is the final packet in the three-way TCP handshake 355 to create a second TCP connection between the TCP intermediate device 315 and the TCP origin server 325. All future packets for this connection are passed without further modification for TCP fast open.

Sometime later, the TCP connection between the TCP client 310 and the TCP intermediate device 315 ends. Since the TCP client 310 believes that the TCP origin server 325 supports TFO, the next time the TCP client 310 attempts to the connect to the TCP origin server 325, it should indicate TFO with the identifier it was previously given. Thus, at operation 8, the TCP intermediate device 315 receives the SYN packet 332 from the TCP client 310. The SYN packet 332 includes the TFO cookie set by the TCP intermediate device 315 included in operation 4. The SYN packet 332 also includes a payload of data.

The intermediate device 315 validates the TFO cookie included in the SYN packet 332 at operation 9. The intermediate device 315 verifies that the TFO cookie included in the SYN packet 332 is valid. For instance, the TCP intermediate device 315 may generate a TFO value based on the connecting TCP client 310 (e.g., based on one or more attributes of the connecting TCP client 310) and compare the two values. If the values are the same, the TFO cookie is valid. The intermediate device 315 also determines that the TCP origin server 325 does not support TFO, by, for example, accessing the stored information that indicates that the TCP origin server 325 does not support TFO.

Since the TCP origin server 325 does not support TFO, the TCP intermediate device 315 initiates a new TCP connection with the TCP origin server 325. Thus, at operation 10, the TCP intermediate device 315 transmits the SYN packet 334 to the TCP origin server 325. In response to the SYN packet 334, the TCP intermediate device 315 receives the SYN-ACK packet 336 from the TCP origin server 325 at operation 11 and responds with the ACK packet 338 at operation 12. The TCP connection is considered to be established after the ACK packet 338 is transmitted and processed. Then, at operation 13, the TCP intermediate device 315 transmits the ACK packet 340 that includes the payload of data that was received from the TCP client 310 in operation 8.

Figure 4:
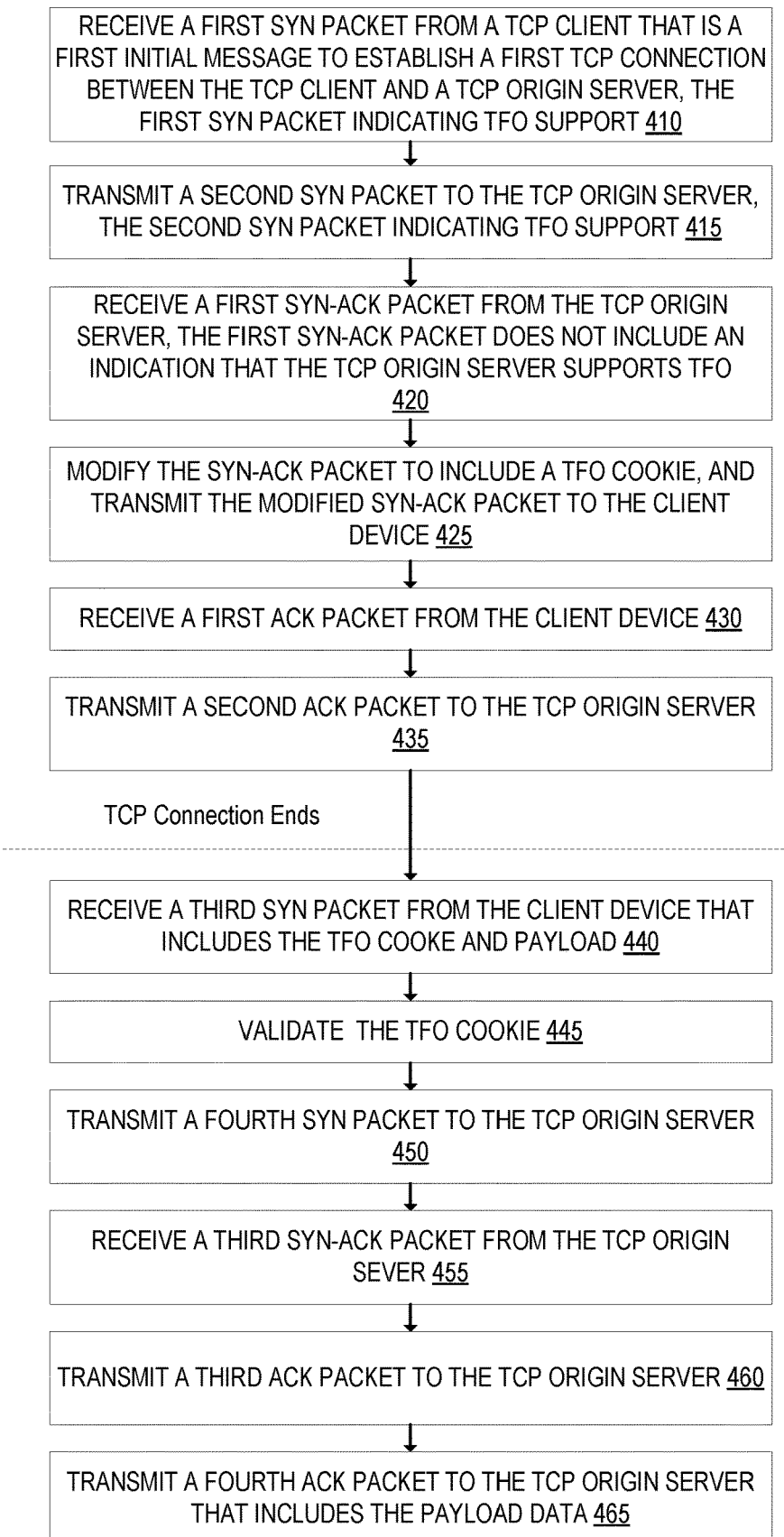
FIG. 4 is a flow diagram that illustrates implementing a TCP Fast Open (TFO) connection between a TCP client and a TCP origin server according to an embodiment.

FIG. 4 is a flow diagram that illustrates implementing a TCP Fast Open (TFO) connection between a TCP client and a TCP origin server according to an embodiment. The operations of FIG. 4 will be described with respect to the exemplary embodiment of FIG. 3. However, the operations of FIG. 4 can be performed by embodiments other than those discussed with reference to FIG. 3, and the embodiments discussed with reference to FIG. 3 can perform operations different than those discussed with reference to FIG. 4.

At operation 410, the TCP intermediate device 315 receives a first SYN packet from the TCP client 310. The first SYN packet is a first initial message to establish a first TCP connection between the TCP client 310 and the TCP origin server 325. The first SYN packet includes an indication that it supports TFO. For instance, the first SYN packet may include a fast open cookie that has no value or a null value for the client to indicate to the server that it supports TFO.

Next, at operation 415, the TCP intermediate device 315 transmits a second SYN packet to the TCP origin server 325. The second SYN packet includes an indication that TFO is supported (e.g., a fast open cookie that has no value or a null value).

Next, at operation 420, the TCP intermediate device 315 receives a first SYN-ACK packet from the TCP origin server 325, where the first SYN-ACK packet does not include an indication that the TCP origin server 325 supports TFO (e.g., it does not include a fast open cookie). Next, at operation 425, the TCP intermediate device 315 modifies the first SYN-ACK packet to include a fast open cookie and transmits the modified SYN-ACK packet to the TCP client 310. The TCP intermediate device 315 may also store an identifier and associate it with the TCP origin server 325. This allows the TCP intermediate device 315 to store data indicating that the TCP origin server 325 does not support TFO. The identifier may be unique and based on the connecting TCP client 310 (e.g., one or more of the attributes of the connecting TCP client 310).

In response to the modified SYN-ACK packet, the TCP intermediate device 315 receives a first ACK packet from the TCP client 310 at operation 430. The first ACK packet is the final packet in the three-way TCP handshake between the TCP client 310 and the TCP intermediate device 315. After receiving and processing first ACK packet, a first TCP connection is established between the TCP client 310 and the TCP intermediate device 315. Next, at operation 435, the TCP intermediate device 315 transmits a second ACK packet to the TCP origin server 325. The second ACK packet is the final packet in the three-way TCP handshake between the TCP intermediate device 315 and the TCP origin server 325 to create a second TCP connection between the TCP intermediate device 315 and the TCP origin server 325. All future packets for this connection are passed without further modification for TCP fast open.

Sometime later, the TCP connection between the TCP client 310 and the TCP intermediate device 315 ends. Since the TCP client 310 believes that the TCP origin server 325 supports TFO (because of the modified SYN-ACK packet), the next time the TCP client 310 attempts to the connect to the TCP origin server 325, it should indicate TFO with the identifier it was previously given. Thus, at operation 440, the TCP intermediate device 315 receives a third SYN packet from the TCP client 310, the third SYN packet including the TFO cookie included in the modified SYN-ACK packet. The third SYN packet also includes a payload of data.

Next, at operation 445, the intermediate device 315 validates the TFO cookie included in the third SYN packet. The intermediate device 315 verifies that the TFO cookie included in the SYN packet is valid. For instance, the TCP intermediate device 315 may generate a TFO value based on the connecting TCP client 310 (e.g., based on one or more attributes of the connecting TCP client 310) and compare the two values. If the values are the same, the TFO cookie is valid. The intermediate device 315 may also determine that the TCP origin server 325 does not support TFO, by, for example, accessing the stored information that indicates that the TCP origin server 325 does not support TFO.

Since the TCP origin server 325 does not support TFO, the TCP intermediate device 315 initiates a new TCP connection with the TCP origin server 325. Thus, at operation 450, the TCP intermediate device 315 transmits a fourth SYN packet to the TCP origin server 325. In response to the fourth SYN packet, the TCP intermediate device 315 receives a SYN-ACK packet from the TCP origin server 325 at operation 455 and responds with a third ACK packet at operation 460. The TCP connection is considered to be established after the ACK packet is transmitted and processed. Then, at operation 465, the TCP intermediate device 315 transmits a fourth ACK packet that includes the payload of data that was received from the TCP client 310.

Figure 5:
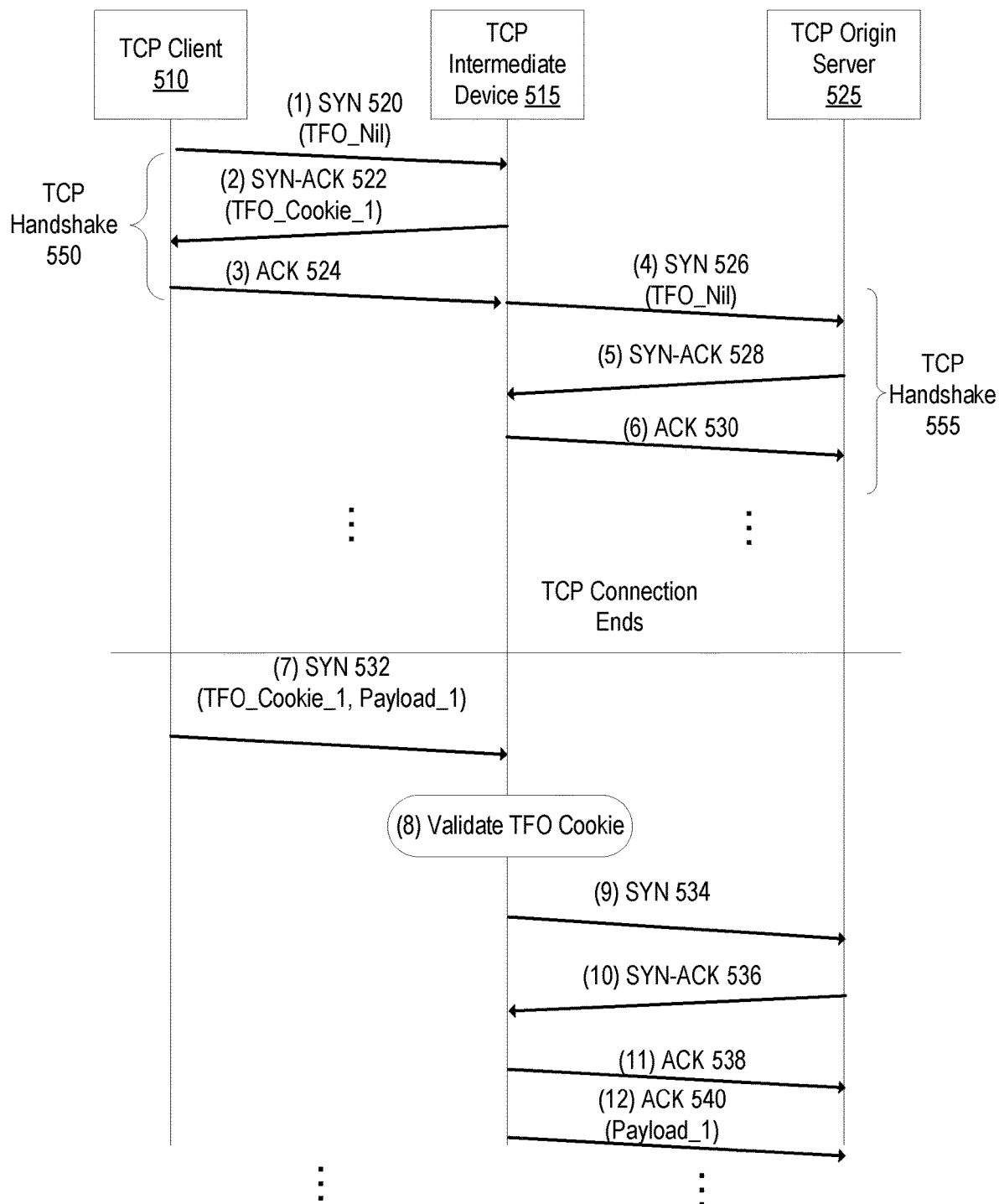
FIG. 5 is a sequence diagram that illustrates implementing a TCP Fast Open (TFO) connection between a TCP client and a TCP origin server according to an embodiment.

FIG. 5 is a sequence diagram that illustrates implementing a TCP Fast Open (TFO) connection between a TCP client and a TCP origin server according to an embodiment. The sequence diagram of FIG. 5 includes the TCP client 510, the TCP intermediate device 515, and the TCP origin server 525. The TCP client 510 may be any client network application that initiates a TCP connection with a server. For example, the client network application may be an Internet browser executing on a client device, a native application executing on a client device, or any other application that implements TCP. The TCP origin server 525 may be a network server and may or may not be an origin server that maintains web pages.

FIG. 5 is like FIG. 3 with the exception that the TCP intermediate device 515 first completes the TCP handshake 550 between the TCP client 510 and the TCP intermediate device 515 before completing the TCP handshake 555 between the TCP intermediate device 515 and the TCP origin server 525. Like with FIG. 3, the TCP origin server 525 does not support TFO.

At operation 1, the TCP intermediate device 315 receives the SYN packet 520 at an interface coupling the TCP client 510 and the TCP intermediate device 515. The SYN packet 520 is destined for the TCP origin server 525 and is transmitted by the TCP client 510 to initiate a TCP connection to the TCP origin server 525. The SYN packet 520 includes as its destination IP address an IP address of the TCP origin server 525. The SYN packet 520 includes an indication that it supports TFO. For instance, the SYN packet may include a fast open cookie that has no value or a null value for the client to indicate to the server that it supports TFO.

Since the TCP intermediate device 515 supports TFO, the TCP intermediate device 515 transmits the SYN-ACK packet 522 that includes a TFO cookie. The TFO cookie may be unique and based on the connecting TCP client 510. The TFO cookie may also be stored in association with the TCP origin server 525 (e.g., as identified by the destination IP address of the SYN packet 520). In response to the SYN-ACK packet 522, the TCP intermediate device 515 receives the ACK packet 524 from the TCP client 510. The ACK packet 524 is the last packet of the three-way TCP handshake 550. After the ACK packet 524 is processed, the TCP connection between the TCP client 510 and the TCP intermediate device 515 is considered established.

Next, at operation 4, the TCP intermediate device 515 transmits the SYN packet 526 to the TCP origin server 525. The SYN packet 526 includes an indication that it supports TFO. For instance, the SYN packet 526 may include a fast open cookie that has no value or a null value.

In the example shown in FIG. 5, the TCP origin server 525 does not support TFO. In response to the SYN packet 526, the TCP intermediate device 515 receives the SYN-ACK packet 528 from the TCP origin server 525 at operation 5, and the SYN-ACK packet 528 does not include a fast open cookie. At operation 6, the TCP intermediate device 515 transmits the ACK packet 530 to the TCP origin server 525. The ACK packet 530 is the final packet in the three-way TCP handshake 555 to create a second TCP connection between the TCP intermediate device 515 and the TCP origin server 525. The TCP intermediate device 515 may also store an identifier and associate it with the TCP origin server 525. This allows the TCP intermediate device 515 to store data indicating that the TCP origin server 525 does not support TFO. The identifier may be unique and based on the connecting TCP client 510 (e.g., one or more of the attributes of the connecting TCP client 510).

Sometime later, the TCP connection between the TCP client 510 and the TCP intermediate device 515 ends. Since the TCP client 510 believes that the TCP origin server 525 supports TFO, the next time the TCP client 510 attempts to the connect to the TCP origin server 525, it should indicate TFO with the identifier it was previously given. Thus, at operation 7, the TCP intermediate device 515 receives the SYN packet 532 from the TCP client 510. The SYN packet 532 includes the TFO cookie set by the TCP intermediate device 515 included in operation 2. The SYN packet 532 also includes a payload of data.

The intermediate device 515 validates the TFO cookie included in the SYN packet 532 at operation 8. The intermediate device 515 verifies that the TFO cookie included in the SYN packet 532 is valid. For instance, the TCP intermediate device 515 may generate a TFO value based on the connecting TCP client 510 (e.g., based on one or more attributes of the connecting TCP client 510) and compare the two values. If the values are the same, the TFO cookie is valid. The intermediate device 515 also determines that the TCP origin server 525 does not support TFO, by, for example, accessing the stored information that indicates that the TCP origin server 525 does not support TFO.

Since the TCP origin server 525 does not support TFO, the TCP intermediate device 515 initiates a new TCP connection with the TCP origin server 525. Thus, at operation 9, the TCP intermediate device 515 transmits the SYN packet 534 to the TCP origin server 525. In response to the SYN packet 534, the TCP intermediate device 515 receives the SYN-ACK packet 536 from the TCP origin server 525 at operation 10 and responds with the ACK packet 538 at operation 11. The TCP connection is considered to be established after the ACK packet 538 is transmitted and processed. Then, at operation 12, the TCP intermediate device 515 transmits the ACK packet 540 that includes the payload of data that was received from the TCP client 510 in operation 7.

FIG. 6 is a flow is a flow diagram that illustrates implementing a TCP Fast Open (TFO) connection between a TCP client and a TCP origin server according to an embodiment. The operations of FIG. 6 will be described with respect to the exemplary embodiment of FIG. 5. However, the operations of FIG. 6 can be performed by embodiments other than those discussed with reference to FIG. 5, and the embodiments discussed with reference to FIG. 5 can perform operations different than those discussed with reference to FIG. 6.

At operation 610, the TCP intermediate device 515 receives a first SYN packet from the TCP client 510. The first SYN packet is a first initial message to establish a first TCP connection between the TCP client 510 and the TCP origin server 525. The first SYN packet includes an indication that it supports TFO. For instance, the first SYN packet may include a fast open cookie that has no value or a null value for the client to indicate to the server that it supports TFO.

Next, at operation 615, the TCP intermediate device 515 transmits a first SYN-ACK packet to the TCP client 510 that includes a TFO cookie. The TFO cookie may be unique and based on the connecting TCP client 510. The TFO cookie may also be stored in association with the TCP origin server 525 (e.g., as identified by the destination IP address of the first SYN packet). In response to the first SYN-ACK packet, the TCP intermediate device 515 receives a first ACK packet from the TCP client 510 at operation 620. The first ACK packet is the last packet of the three-way TCP handshake between the TCP client 510 and the TCP intermediate device 515. After the first ACK packet is processed, the TCP connection between the TCP client 510 and the TCP intermediate device 515 is considered established.

Next, at operation 625, the TCP intermediate device 515 transmits a second SYN packet to the TCP origin server 525. The second SYN packet is a second initial message to establish a second TCP connection between the TCP intermediate device 515 and the TCP origin server 525. The second SYN packet includes an indication that it supports TFO. For instance, the second SYN packet may include a fast open cookie that has no value or a null value.

In the example of FIGS. 5 and 6, the TCP origin server 525 does not support TFO. In response to the second SYN packet, the TCP intermediate device 515 receives a second SYN-ACK packet from the TCP origin server 525 at operation 630. The second SYN-ACK packet does not include a fast open cookie. Then, at operation 635, the TCP intermediate device 515 transmits a second ACK packet to the TCP origin server 525. The second ACK packet is the final packet in the three-way TCP handshake between TCP intermediate device 515 and the TCP origin server to create a second TCP connection between the TCP intermediate device 515 and the TCP origin server 525. The TCP intermediate device 515 may also store an identifier and associate it with the TCP origin server 525. This allows the TCP intermediate device 515 to store data indicating that the TCP origin server 525 does not support TFO. The identifier may be unique and based on the connecting TCP client 510 (e.g., one or more of the attributes of the connecting TCP client 510).

Sometime later, the TCP connection between the TCP client 510 and the TCP intermediate device 515 ends. Since the TCP client 510 believes that the TCP origin server 525 supports TFO, the next time the TCP client 510 attempts to the connect to the TCP origin server 525, it should indicate TFO with the identifier it was previously given. Thus, at operation 640, the TCP intermediate device 515 receives a third SYN packet from the TCP client 510, the third SYN packet including the TFO cookie set by the TCP intermediate device 515 and included in the first SYN-ACK packet. The third SYN packet also includes a payload of data.

Next, at operation 645, the intermediate device 515 validates the TFO cookie included in the third SYN packet. The intermediate device 515 verifies that the TFO cookie included in the SYN packet is valid. For instance, the TCP intermediate device 515 may generate a TFO value based on the connecting TCP client 510 (e.g., based on one or more attributes of the connecting TCP client 510) and compare the two values. If the values are the same, the TFO cookie is valid. The intermediate device 515 may also determine that the TCP origin server 525 does not support TFO, by, for example, accessing the stored information that indicates that the TCP origin server 525 does not support TFO.

Since the TCP origin server 525 does not support TFO, the TCP intermediate device 515 initiates a new TCP connection with the TCP origin server 525. Thus, at operation 650, the TCP intermediate device 515 transmits a fourth SYN packet to the TCP origin server 525. In response to the fourth SYN packet, the TCP intermediate device 515 receives a third SYN-ACK packet from the TCP origin server 525 at operation 655 and responds with a third ACK packet at operation 660. The TCP connection is considered to be established after the ACK packet is transmitted and processed. Then, at operation 665, the TCP intermediate device 515 transmits a fourth ACK packet to the TCP origin server 525 that includes the payload of data that was received from the TCP client 510.

Figure 7:
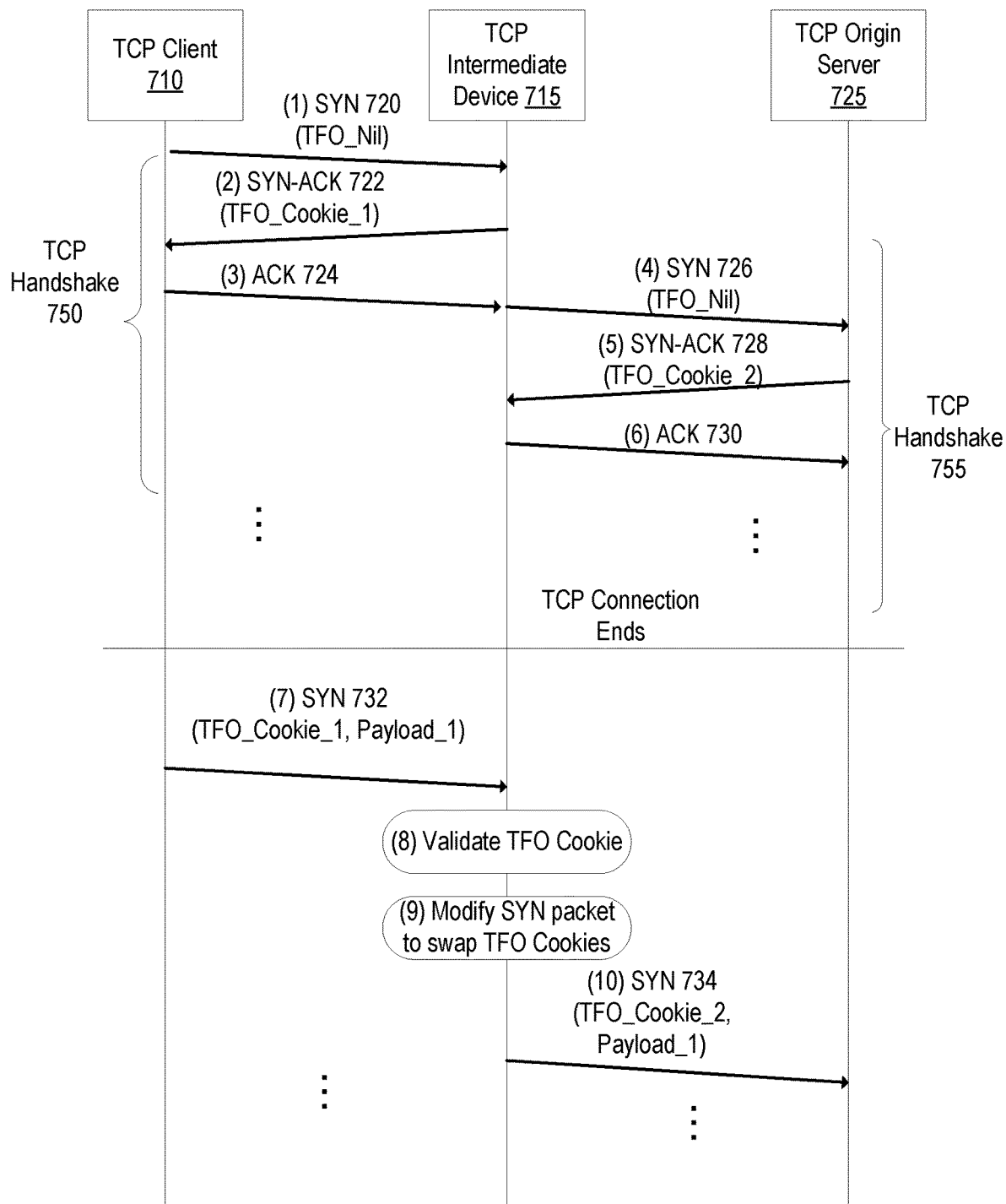
FIG. 7 is a sequence diagram that illustrates implementing a TCP Fast Open (TFO) connection between a TCP client and a TCP origin server according to an embodiment.

FIG. 7 is a sequence diagram that illustrates implementing a TCP Fast Open (TFO) connection between a TCP client and a TCP origin server according to an embodiment. The sequence diagram of FIG. 7 includes the TCP client 710, the TCP intermediate device 715, and the TCP origin server 725. The TCP client 710 may be any client network application that initiates a TCP connection with a server. For example, the client network application may be an Internet browser executing on a client device, a native application executing on a client device, or any other application that implements TCP. The TCP origin server 725 may be a network server and may or may not be an origin server that maintains web pages.

In the example of FIG. 7, the TCP origin server 725 supports TFO. However, at the time of responding to the TCP client 710 during the initial handshake, the TCP intermediate device 715 may not have information indicating that the TCP origin server 725 supports TFO. Like the example in FIG. 5, the TCP intermediate device 715 first completes the TCP handshake 750 between the TCP client 710 and the TCP intermediate device 715 before completing the TCP handshake 755 between the TCP intermediate device 715 and the TCP origin server 725.

At operation 1, the TCP intermediate device 715 receives the SYN packet 720 at an interface coupling the TCP client 710 and the TCP intermediate device 715. The SYN packet 720 is destined for the TCP origin server 725 and is transmitted by the TCP client 710 to initiate a TCP connection to the TCP origin server 725. The SYN packet 720 includes as its destination IP address an IP address of the TCP origin server 725. The SYN packet 720 includes an indication that it supports TFO. For instance, the SYN packet may include a fast open cookie that has no value or a null value for the client to indicate to the server that it supports TFO.

Since the TCP intermediate device 715 supports TFO, the TCP intermediate device 715 transmits the SYN-ACK packet 722 that includes a TFO cookie (TFO_cookie_1). The TFO cookie may be unique and based on the connecting TCP client 710. The TFO cookie may also be stored in association with the TCP origin server 725 (e.g., as identified by the destination IP address of the SYN packet 720). In response to the SYN-ACK packet 722, the TCP intermediate device 715 receives the ACK packet 724 from the TCP client 710. The ACK packet 724 is the last packet of the three-way TCP handshake 750. After the ACK packet 724 is processed, the TCP connection between the TCP client 710 and the TCP intermediate device 715 is considered established.

Next, at operation 4, the TCP intermediate device 715 transmits the SYN packet 726 to the TCP origin server 725. The SYN packet 726 includes an indication that it supports TFO. For instance, the SYN packet 726 may include a fast open cookie that has no value or a null value.

In the example of FIG. 7, the TCP origin server 725 supports TFO. In response to the SYN packet 726, the TCP intermediate device receives the SYN-ACK packet 728 from the TCP origin server 725 at operation 5. The SYN-ACK packet 728 includes a TFO cookie (TFO_cookie_2) set by the TCP origin server 725. The TCP intermediate device 715 may store the TFO cookie received from the TCP origin server 725 for future use. At operation 6, the TCP intermediate device 715 transmits the ACK packet 730 to the TCP origin server 725. The ACK packet 730 is the final packet in the three-way TCP handshake 755 to create a second TCP connection between the TCP intermediate device 715 and the TCP origin server 725.

Sometime later, the TCP connection between the TCP client 710 and the TCP intermediate device 715 ends. Since the TCP client 710 believes that the TCP origin server 725 supports TFO, the next time the TCP client 710 attempts to the connect to the TCP origin server 725, it should indicate TFO with the identifier it was previously given. Thus, at operation 7, the TCP intermediate device 715 receives the SYN packet 732 from the TCP client 710. The SYN packet 732 includes the TFO cookie set by the TCP intermediate device 715 included in operation 2 (TFO_Cookie_1). The SYN packet 732 also includes a payload of data.

The intermediate device 715 validates the TFO cookie included in the SYN packet 732 at operation 8. The intermediate device 715 verifies that the TFO cookie included in the SYN packet 732 is valid. For instance, the TCP intermediate device 715 may generate a TFO value based on the connecting TCP client 710 (e.g., based on one or more attributes of the connecting TCP client 710) and compare the two values. If the values are the same, the TFO cookie is valid. The intermediate device 715 also determines that the TCP origin server 725 supports TFO and accesses the stored TFO cookie it received from the TCP origin server 725 at operation 5. At operation 9, the TCP intermediate device 715 modifies the SYN packet 732 to swap the TFO cookie included in the SYN packet 732 with the TFO cookie received from the TCP origin server 725 in operation 5. Thus, at operation 10, the TCP intermediate device 715 transmits the SYN packet 734 to the TCP origin server 725 that includes the TFO cookie received from the TCP origin server 725 (TFO_Cookie_2) instead of the TFO cookie received from the TCP client 710. The SYN packet 734 also includes the payload of data received from the TCP client 710 in operation 7.

FIG. 8 is a flow is a flow diagram that illustrates implementing a TCP Fast Open (TFO) connection between a TCP client and a TCP origin server according to an embodiment.

The operations of FIG. 8 will be described with respect to the exemplary embodiment of FIG. 7. However, the operations of FIG. 8 can be performed by embodiments other than those discussed with reference to FIG. 7, and the embodiments discussed with reference to FIG. 7 can perform operations different than those discussed with reference to FIG. 8.

At operation 810, the TCP intermediate device 715 receives a first SYN packet from the TCP client 710. The first SYN packet is a first initial message to establish a first TCP connection between the TCP client 710 and the TCP origin server 725. The first SYN packet includes an indication that it supports TFO. For instance, the first SYN packet may include a fast open cookie that has no value or a null value for the client to indicate to the server that it supports TFO.

Next, at operation 815, the TCP intermediate device 715 transmits a first SYN-ACK packet to the TCP client 710 that includes a TFO cookie. The TFO cookie may be unique and based on the connecting TCP client 710. The TFO cookie may also be stored in association with the TCP origin server 725 (e.g., as identified by the destination IP address of the first SYN packet). In response to the first SYN-ACK packet, the TCP intermediate device 715 receives a first ACK packet from the TCP client 710 at operation 820. The first ACK packet is the last packet of the three-way TCP handshake between the TCP client 710 and the TCP intermediate device 715. After the first ACK packet is processed, the TCP connection between the TCP client 710 and the TCP intermediate device 715 is considered established.

Next, at operation 825, the TCP intermediate device 715 transmits a second SYN packet to the TCP origin server 725. The second SYN packet is a second initial message to establish a second TCP connection between the TCP intermediate device 715 and the TCP origin server 725. The second SYN packet includes an indication that it supports TFO. For instance, the second SYN packet may include a fast open cookie that has no value or a null value.

In the example of FIGS. 7 and 8, the TCP origin server 725 supports TFO. In response to the second SYN packet, the TCP intermediate device 715 receives a second SYN-ACK packet from the TCP origin server 725 at operation 830. The second SYN-ACK packet includes a TFO cookie (TFO_cookie_2) set by the TCP origin server 725. The TCP intermediate device 715 may store the TFO cookie received from the TCP origin server 725 for future use. Then, at operation 835, the TCP intermediate device 715 transmits a second ACK packet to the TCP origin server 725. The second ACK packet is the final packet in the three-way TCP handshake between TCP intermediate device 715 and the TCP origin server 725 to create a second TCP connection between the TCP intermediate device 715 and the TCP origin server 725.

Sometime later, the TCP connection between the TCP client 710 and the TCP intermediate device 715 ends. Since the TCP client 710 believes that the TCP origin server 725 supports TFO, the next time the TCP client 710 attempts to the connect to the TCP origin server 725, it should indicate TFO with the identifier it was previously given. Thus, at operation 840, the TCP intermediate device 715 receives a third SYN packet from the TCP client 710, the third SYN packet including the TFO cookie set by the TCP intermediate device 715 and included in the first SYN-ACK packet. The third SYN packet also includes a payload of data.

Next, at operation 845, the intermediate device 715 validates the TFO cookie included in the third SYN packet. The intermediate device 715 verifies that the TFO cookie included in the SYN packet is valid. For instance, the TCP intermediate device 715 may generate a TFO value based on the connecting TCP client 710 (e.g., based on one or more attributes of the connecting TCP client 710) and compare the two values. If the values are the same, the TFO cookie is valid. The intermediate device 715 may also determine that the TCP origin server 525 supports TFO, by, for example, accessing the stored information that indicates that the TCP origin server 725 supports TFO. The intermediate device 715 also accesses the stored TFO cookie it received from the TCP origin server 725 at operation 830.

At operation 850, the TCP intermediate device 715 modifies the third SYN packet to swap the TFO cookie included in the third SYN packet with the second TFO cookie received from the TCP origin server 725 in the second SYN-ACK packet in operation 830.

Next, at operation 855, the TCP intermediate device 715 transmits a fourth SYN packet to the TCP origin server 725 that includes the second TFO cookie received from the TCP origin server 725 (TFO_Cookie_2) instead of the TFO cookie received from the TCP client 710. The fourth SYN packet also includes the payload of data received from the TCP client 710 in the third SYN packet received in operation 840.

Figure 9:
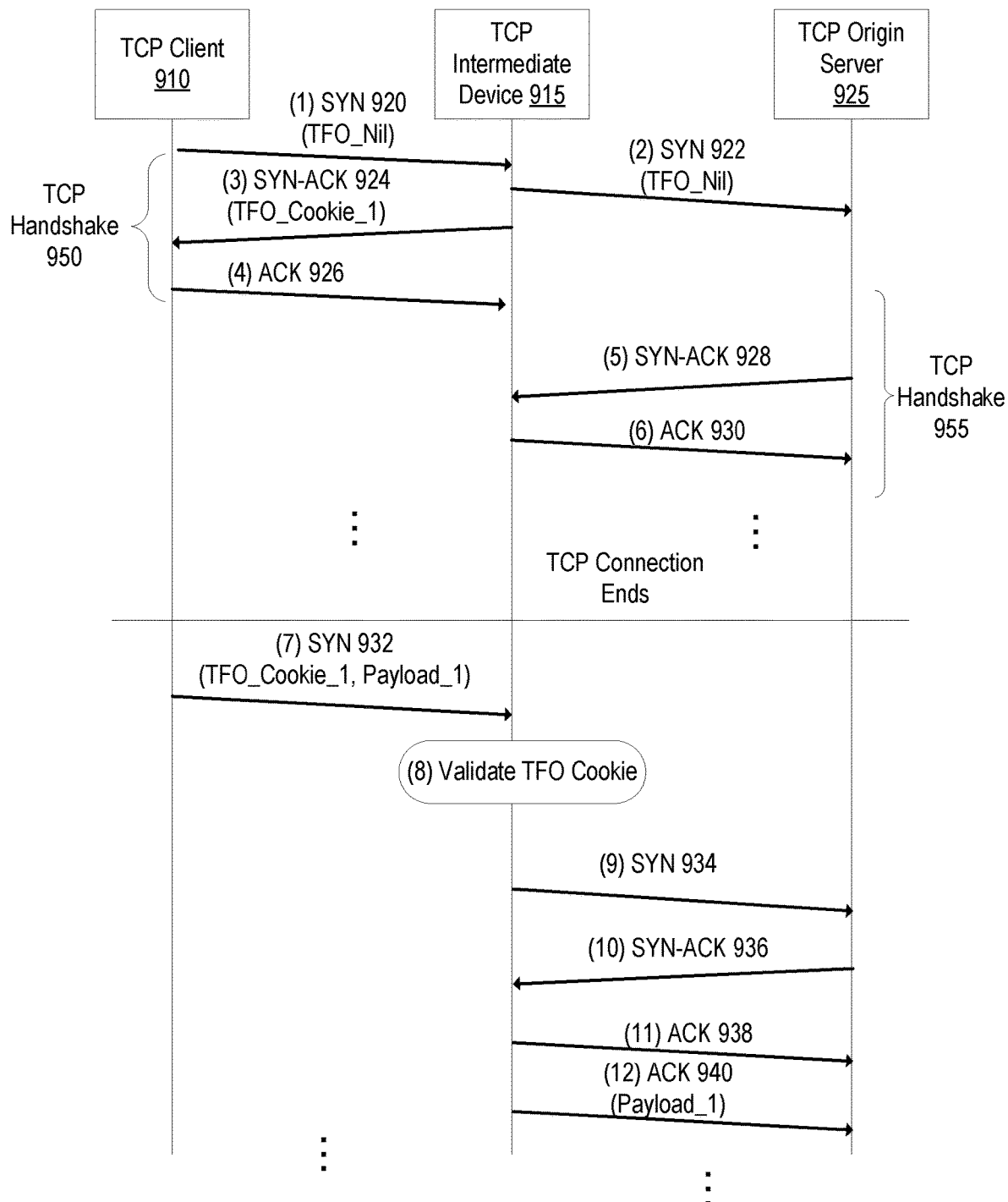
FIG. 9 is a sequence diagram that illustrates implementing a TCP Fast Open (TFO) connection between a TCP client and a TCP origin server according to an embodiment.

FIG. 9 is a sequence diagram that illustrates implementing a TCP Fast Open (TFO) connection between a TCP client and a TCP origin server according to an embodiment. The sequence diagram of FIG. 9 includes the TCP client 910, the TCP intermediate device 915, and the TCP origin server 925. The TCP client 910 may be any client network application that initiates a TCP connection with a server. For example, the client network application may be an Internet browser executing on a client device, a native application executing on a client device, or any other application that implements TCP. The TCP origin server 925 may be a network server and may or may not be an origin server that maintains web pages.

In the example of FIG. 9, the initial connection is established with a similar technique as described with respect to FIG. 1. That is, the TCP intermediate device 915 opportunistically initiates a TCP connection with the TCP origin server 925 without waiting for the completion of the TCP handshake between the TCP client 910 and the TCP intermediate device 915.

At operation 1, the TCP intermediate device 915 receives a SYN packet 920 from the TCP client 910 at an interface coupling the TCP client 910 and the TCP intermediate device 915. The SYN packet 920 is destined for the TCP origin server 925 and is transmitted by the TCP client 910 to initiate a TCP connection to the TCP origin server 925. The SYN packet 920 includes as its destination IP address an IP address of the TCP origin server 925. The SYN packet 920 includes an indication that it supports TFO. For instance, the SYN packet 920 may include a fast open cookie that has no value or a null value for the client to indicate to the server that it supports TFO.

In an embodiment, the TCP intermediate device 915 performs the opportunistic TCP connection process only when the initiating message is addressed to the TCP origin server 925 (and not addressed to the TCP intermediate device 915). The TCP intermediate device 915 may examine the destination IP packet and protocol type in the IP header and check whether the SYN flag in the TCP header is set (and the ACK, FIN, RST, and PHS flags are unset) when determining whether the initiating message is a SYN packet addressed to the TCP origin server 925.

In an embodiment, the TCP intermediate device 915 determines whether to perform the opportunistic TCP connection described herein. The TCP intermediate device 915 may determine whether to perform the opportunistic TCP connection based on one or more of the following attributes including: the address of the TCP client 910, the network and/or path taken by packets from the TCP client 910 (e.g., whether traffic is received on a trusted interface or an authenticated IP tunnel), the number of initiated but not yet established connections made by the TCP client 910 and/or destined for the TCP origin server 925 either in total or an individual basis, and the amount of resources available or used of the TCP intermediate device 915.

By way of example, the TCP intermediate device 915 may be configured to perform opportunistic TCP connection establishment only if the SYN packet 920 is received on a trusted interface or an authenticated IP tunnel. Additionally, or alternatively, the TCP intermediate device 915 may determine the number of initiated TCP connections but not yet established connections made by the TCP client 910 and/or destined for the TCP origin server 925 either in total or an individual basis and perform opportunistic TCP connection establishment only if below a threshold. Additionally, or alternatively, the TCP intermediate device 915 may perform the opportunistic TCP connection establishment only if the amount of resources available on the TCP intermediate device 915 is over a threshold.

After receiving the SYN packet 920 from the TCP client 910 and without waiting for the completion of the TCP handshake 950, the TCP intermediate device 915 initiates the TCP handshake 955 with the TCP origin server 925. Thus, at operation 2, the TCP intermediate device 915 transmits a SYN packet 922 to the TCP origin server 925 to initiate the TCP handshake 955. The SYN packet 922 includes an indication that TFO is supported. For instance, the SYN packet 922 may include a fast open cookie that has no value or a null value.

At operation 3, the TCP intermediate device 915 transmits a SYN-ACK packet 924 to the TCP client 910 as part of the TCP handshake 950. The SYN-ACK packet 924 appears to be from the TCP origin server 925 (e.g., it includes as its source IP address the IP address of the TCP origin server 925 which was the destination IP address in the SYN packet 920). Thus, it appears to the TCP client 910 as if the TCP origin server 925 transmitted the SYN-ACK packet 924. The SYN-ACK packet 924 includes a TFO cookie (TFO_cookie_1) set by the TCP intermediate device 915. The TFO cookie may be unique and based on the connecting TCP client 910. The TFO cookie may also be stored in association with the TCP origin server 925 (e.g., as identified by the destination IP address of the SYN packet 920). In response to the SYN-ACK packet 924, the TCP intermediate device 915 receives the ACK packet 926 from the TCP client 910 at operation 4. The ACK packet 926 is the last packet of the three-way TCP handshake 950. After the ACK packet 926 is processed, the TCP connection between the TCP client 910 and the TCP intermediate device 915 is considered established.

In the example of FIG. 9, the TCP origin server 925 does not support TFO. At operation 5, the TCP intermediate device 915 receives a SYN-ACK packet 928 from the TCP origin server 925 in response to the SYN packet 922 as part of the TCP handshake 955. In response to the SYN-ACK packet 928, the TCP intermediate device 915 transmits the ACK packet 930 to the TCP origin server 925 at operation 6. The ACK packet 930 is the final packet in the three-way TCP handshake 955. Thus, after receiving and processing the ACK packet 930, a second TCP connection is established between the TCP intermediate device 915 and the TCP origin server 925.

Although FIG. 9 illustrates the packets being sent and received in a particular order, the packets may be sent and received by the TCP intermediate device 915 in a different order while not waiting for the first TCP connection between the TCP client 910 and the TCP intermediate device 915 to complete. For instance, the TCP intermediate device 915 may transmit the SYN-ACK packet 924 before transmitting the SYN packet 922. As another example, the TCP intermediate device 915 may receive the SYN-ACK packet 928 prior to receiving the ACK packet 926.

Because the TCP intermediate device 915 does not wait until the first TCP connection with the TCP client is complete before initiating the second TCP connection with the TCP origin server, the second TCP connection is completed faster than in conventional implementations which may improve the time to first byte (TTFB).

Sometime later, the TCP connection between the TCP client 910 and the TCP intermediate device 915 ends. Since the TCP client 910 believes that the TCP origin server 925 supports TFO, the next time the TCP client 910 attempts to the connect to the TCP origin server 925, it should indicate TFO with the identifier it was previously given. Thus, at operation 7, the TCP intermediate device 915 receives the SYN packet 932 from the TCP client 910. The SYN packet 932 includes the TFO cookie set by the TCP intermediate device 915 included in operation 3. The SYN packet 932 also includes a payload of data.

The intermediate device 915 validates the TFO cookie included in the SYN packet 932 at operation 8. The intermediate device 915 verifies that the TFO cookie included in the SYN packet 932 is valid. For instance, the TCP intermediate device 915 may generate a TFO value based on the connecting TCP client 910 (e.g., based on one or more attributes of the connecting TCP client 910) and compare the two values. If the values are the same, the TFO cookie is valid. The intermediate device 915 also determines that the TCP origin server 925 does not support TFO, by, for example, accessing the stored information that indicates that the TCP origin server 925 does not support TFO.

Since the TCP origin server 925 does not support TFO, the TCP intermediate device 915 initiates a new TCP connection with the TCP origin server 925. Thus, at operation 9, the TCP intermediate device 915 transmits the SYN packet 934 to the TCP origin server 925. In response to the SYN packet 934, the TCP intermediate device 915 receives the SYN-ACK packet 936 from the TCP origin server 925 at operation 10 and responds with the ACK packet 938 at operation 11. The TCP connection is considered to be established after the ACK packet 938 is transmitted and processed. Then, at operation 12, the TCP intermediate device 915 transmits the ACK packet 940 that includes the payload of data that was received from the TCP client 910 in operation 7.

Figure 10:
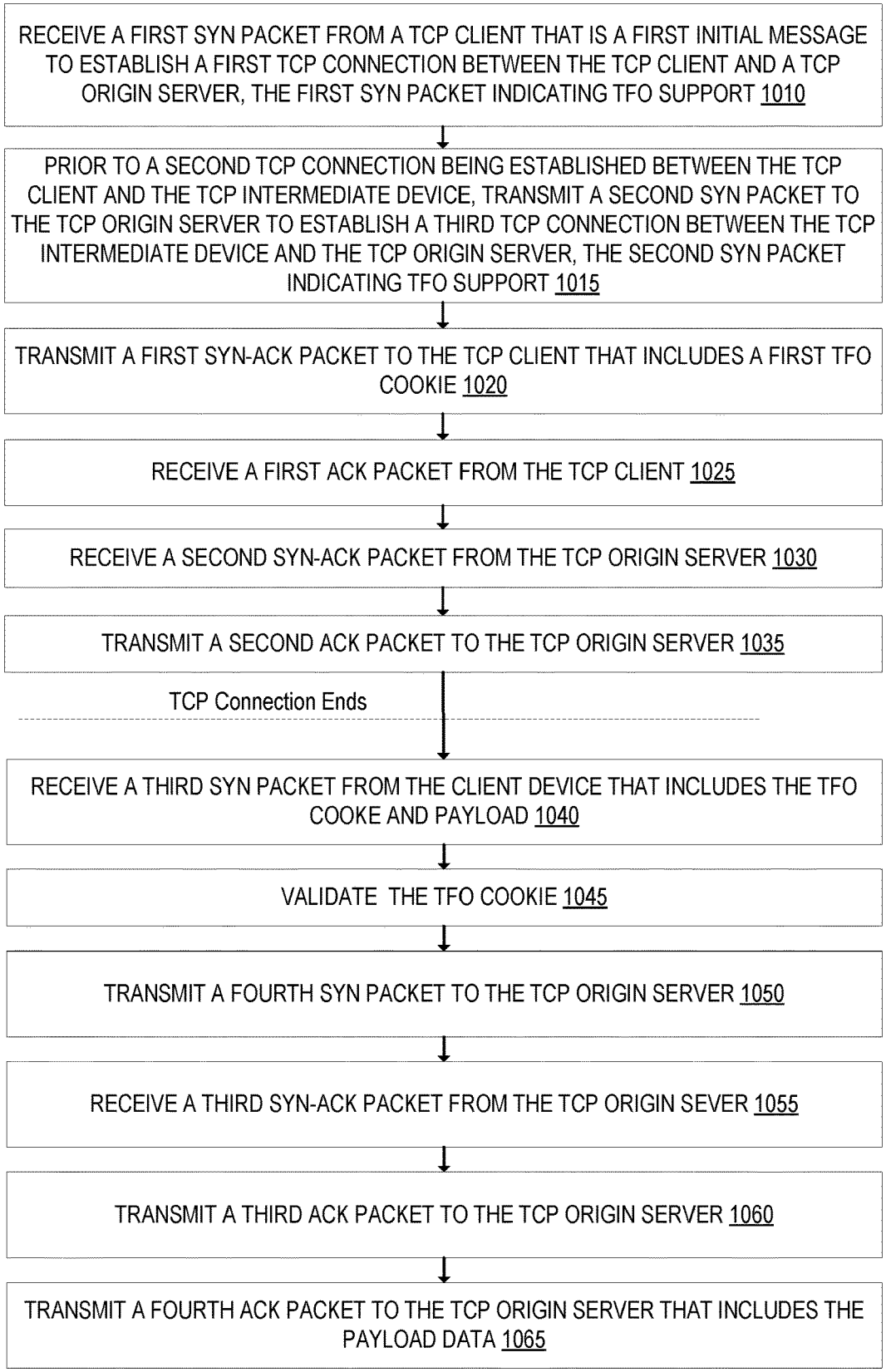
FIG. 10 is a flow diagram that illustrates implementing a TCP Fast Open (TFO) connection between a TCP client and a TCP origin server according to an embodiment.

FIG. 10 is a flow diagram that illustrates implementing a TCP Fast Open (TFO) connection between a TCP client and a TCP origin server according to an embodiment. The operations of FIG. 10 will be described with respect to the exemplary embodiment of FIG. 9. However, the operations of FIG. 10 can be performed by embodiments other than those discussed with reference to FIG. 9, and the embodiments discussed with reference to FIG. 9 can perform operations different than those discussed with reference to FIG. 10.

In the example of FIG. 10, the initial connection is established in a similar way as FIG. 1 where the intermediate device 915 opportunistically initiates a TCP connection with the TCP origin server 925 without waiting for the completion of the TCP handshake between the TCP client 910 and the TCP intermediate device 915.

At operation 1010, the TCP intermediate device 915 receives a first SYN packet from the TCP client 910. The first SYN packet is a first initial message to establish a first TCP connection between the TCP client 910 and the TCP origin server 925. The first SYN packet is addressed to the TCP origin server 925. The TCP intermediate device 915 splits the first TCP connection into two connections; a second connection between the TCP client 910 and the TCP intermediate device 915, and a third connection between the TCP intermediate device 915 and the TCP origin server 925. The first SYN packet includes an indication that it supports TFO. For instance, the first SYN packet may include a fast open cookie that has no value or a null value for the client to indicate to the server that it supports TFO.

Next, at operation 1015, prior to the second TCP connection between being fully established (e.g., prior to the three-way handshake between the TCP client 910 and the TCP intermediate device 915 being complete), the TCP intermediate device 915 transmits a second SYN packet to the TCP origin server 925. The second SYN packet is a second initial message to establish a third TCP connection between the TCP intermediate device 915 and the TCP origin server 925. The second SYN packet includes an indication that TFO is supported. For instance, the second SYN packet may include a fast open cookie that has no value or a null value.

Prior to operation 1015, the TCP intermediate device 915 may determine that the first SYN packet is addressed to the TCP origin server 925. Prior to operation 1015, the TCP intermediate device 915 may determine that the first SYN packet is received on a trusted interface or authenticated IP tunnel. If it was not received on a trusted interface or authenticated IP tunnel, the TCP intermediate device 915 may not perform the concurrent TCP connection establishment. Prior to operation 1025, the TCP intermediate device 915 may determine that a number of number of TCP connection initiations received from the TCP client but a connection is not established does not exceed a threshold; if it exceeded the threshold, the TCP intermediate device 915 may not perform the concurrent TCP connection. Prior to operation 1025, the TCP intermediate device 915 may determine that a number of TCP connection initiations to the TCP origin server where a TCP connection is not established does not exceed a threshold; if it exceeded the threshold, the TCP intermediate device 915 may not perform the concurrent TCP connection.

At operation 1020, the TCP intermediate device 915 transmits a first SYN-ACK packet to the TCP client 910 as part of establishing the second TCP connection between the TCP client 910 and the TCP intermediate device 915. The SYN-ACK packet appears to be from the TCP origin server 925 (e.g., it includes as its source IP address the IP address of the TCP origin server 925 which was the destination IP address in the SYN packet received from the TCP client 910). Thus, it appears to the TCP client 910 as if the TCP origin server 925 transmitted the first SYN-ACK packet. The first SYN-ACK packet includes a first TFO cookie that is set by the TCP intermediate device 915. The first TFO cookie may be unique and based on the connecting TCP client 710. The TFO cookie may also be stored in association with the TCP origin server 725 (e.g., as identified by the destination IP address of the SYN packet 720).

Next, at operation 1025, the TCP intermediate device 915 receives a first ACK packet from the TCP client 910 as part of establishing the second TCP connection between the TCP client 910 and the TCP intermediate device 915. The first ACK packet is the final packet in the three-way TCP handshake to establish the second TCP connection. Thus, the second TCP connection is established responsive to processing the first ACK packet from the TCP client 910.

Next, at operation 1030, the TCP intermediate device 915 receives a second SYN-ACK packet from the TCP origin server 925 as part of establishing the third TCP connection between the TCP intermediate device 915 and the TCP origin server 925. In the example of FIG. 9 and FIG. 10, the TCP origin server 925 does not support TFO. Thus, the second SYN-ACK packet will not include a TFO cookie. Next, at operation 1035, the TCP intermediate device 915 transmits a second ACK packet to the TCP origin server 925 as part of establishing the third TCP connection. The second ACK packet is the final packet in the three-way TCP handshake to establish the third TCP connection. Thus, the third TCP connection is established response to processing the second ACK packet.

Although FIG. 10 illustrates the packets being sent and received in a particular order, the packets may be sent and received by the TCP intermediate device 915 in a different order while not waiting for the first TCP connection between the TCP client 910 and the TCP intermediate device 915 to complete. For instance, the TCP intermediate device 915 may transmit the first SYN-ACK packet of operation 1020 before transmitting the second SYN packet of operation 1015. As another example, the TCP intermediate device 915 may receive the second SYN-ACK packet of operation 1030 prior to receiving the first ACK packet of operation 1025.

Sometime later, the TCP connection between the TCP client 910 and the TCP intermediate device 915 ends. Since the TCP client 910 believes that the TCP origin server 925 supports TFO, the next time the TCP client 910 attempts to the connect to the TCP origin server 925, it should indicate TFO with the identifier it was previously given. Thus, at operation 1040, the TCP intermediate device 915 receives a third SYN packet from the TCP client 910, the third SYN packet including the TFO cookie set by the TCP intermediate device 915 and included in the first SYN-ACK packet. The third SYN packet also includes a payload of data.

Next, at operation 1045, the intermediate device 915 validates the TFO cookie included in the third SYN packet. The intermediate device 915 verifies that the TFO cookie included in the SYN packet is valid. For instance, the TCP intermediate device 915 may generate a TFO value based on the connecting TCP client 910 (e.g., based on one or more attributes of the connecting TCP client 910) and compare the two values. If the values are the same, the TFO cookie is valid. The intermediate device 915 may also determine that the TCP origin server 925 does not support TFO, by, for example, accessing the stored information that indicates that the TCP origin server 925 does not support TFO.

Since the TCP origin server 925 does not support TFO, the TCP intermediate device 915 initiates a new TCP connection with the TCP origin server 925. Thus, at operation 1050, the TCP intermediate device 915 transmits a fourth SYN packet to the TCP origin server 925. In response to the fourth SYN packet, the TCP intermediate device 915 receives a third SYN-ACK packet from the TCP origin server 925 at operation 1055 and responds with a third ACK packet at operation 1060. The TCP connection is considered to be established after the ACK packet is transmitted and processed. Then, at operation 1065, the TCP intermediate device 915 transmits a fourth ACK packet to the TCP origin server 925 that includes the payload of data that was received from the TCP client 910.

Figure 11:
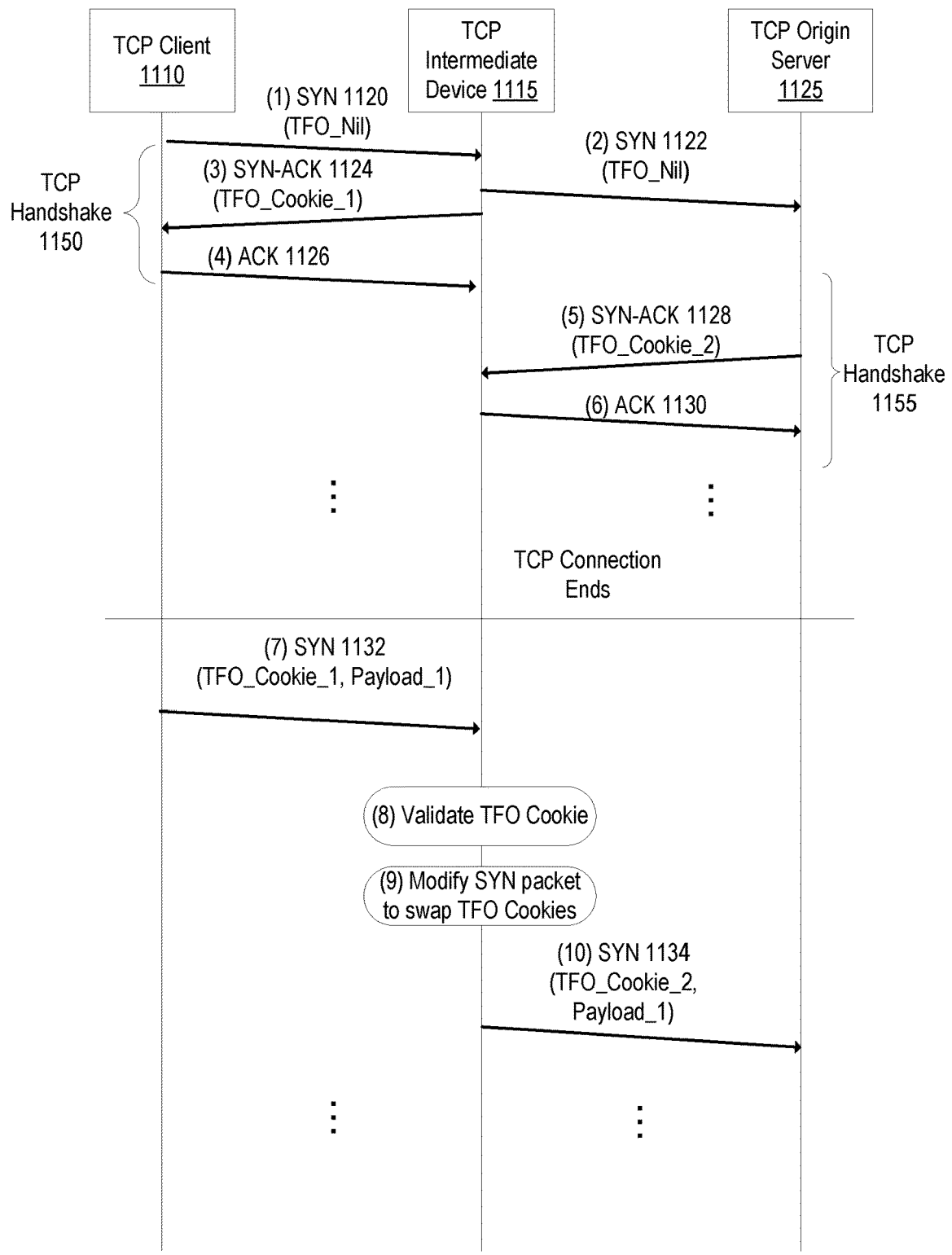
FIG. 11 is a sequence diagram that illustrates implementing a TCP Fast Open (TFO) connection between a TCP client and a TCP origin server according to an embodiment.

FIG. 11 is a sequence diagram that illustrates implementing a TCP Fast Open (TFO) connection between a TCP client and a TCP origin server according to an embodiment. The sequence diagram of FIG. 11 includes the TCP client 1110, the TCP intermediate device 1115, and the TCP origin server 1125. The TCP client 1110 may be any client network application that initiates a TCP connection with a server. For example, the client network application may be an Internet browser executing on a client device, a native application executing on a client device, or any other application that implements TCP. The TCP origin server 1125 may be a network server and may or may not be an origin server that maintains web pages.

In the example of FIG. 11 the initial connection is established with a similar technique as described with respect to FIG. 1. That is, the TCP intermediate device 1115 opportunistically initiates a TCP connection with the TCP origin server 1125 without waiting for the completion of the TCP handshake between the TCP client 1110 and the TCP intermediate device 1115. Unlike the example of FIG. 9, in FIG. 11 the TCP origin server 1125 supports TFO.

At operation 1, the TCP intermediate device 1115 receives a SYN packet 1120 from the TCP client 1110 at an interface coupling the TCP client 1110 and the TCP intermediate device 1115. The SYN packet 1120 is destined for the TCP origin server 1125 and is transmitted by the TCP client 1110 to initiate a TCP connection to the TCP origin server 1125. The SYN packet 1120 includes as its destination IP address an IP address of the TCP origin server 1125. The SYN packet 1120 includes an indication that it supports TFO. For instance, the SYN packet 1120 may include a fast open cookie that has no value or a null value for the client to indicate to the server that it supports TFO.

In an embodiment, the TCP intermediate device 1115 performs the opportunistic TCP connection process only when the initiating message is addressed to the TCP origin server 1125 (and not addressed to the TCP intermediate device 1115). The TCP intermediate device 1115 may examine the destination IP packet and protocol type in the IP header and check whether the SYN flag in the TCP header is set (and the ACK, FIN, RST, and PHS flags are unset) when determining whether the initiating message is a SYN packet addressed to the TCP origin server 1125.

In an embodiment, the TCP intermediate device 1115 determines whether to perform the opportunistic TCP connection described herein. The TCP intermediate device 1115 may determine whether to perform the opportunistic TCP connection based on one or more of the following attributes including: the address of the TCP client 1110, the network and/or path taken by packets from the TCP client 1110 (e.g., whether traffic is received on a trusted interface or an authenticated IP tunnel), the number of initiated but not yet established connections made by the TCP client 1110 and/or destined for the TCP origin server 1125 either in total or an individual basis, and the amount of resources available or used of the TCP intermediate device 1115.

By way of example, the TCP intermediate device 1115 may be configured to perform opportunistic TCP connection establishment only if the SYN packet 1120 is received on a trusted interface or an authenticated IP tunnel. Additionally, or alternatively, the TCP intermediate device 1115 may determine the number of initiated TCP connections but not yet established connections made by the TCP client 1110 and/or destined for the TCP origin server 1125 either in total or an individual basis and perform opportunistic TCP connection establishment only if below a threshold. Additionally, or alternatively, the TCP intermediate device 1115 may perform the opportunistic TCP connection establishment only if the amount of resources available on the TCP intermediate device 1115 is over a threshold.

After receiving the SYN packet 1120 from the TCP client 1110 and without waiting for the completion of the TCP handshake 1150, the TCP intermediate device 1115 initiates the TCP handshake 1155 with the TCP origin server 1125. Thus, at operation 2, the TCP intermediate device 1115 transmits a SYN packet 1122 to the TCP origin server 1125 to initiate the TCP handshake 1155. The SYN packet 1122 includes an indication that TFO is supported. For instance, the SYN packet 1122 may include a fast open cookie that has no value or a null value.

At operation 3, the TCP intermediate device 1115 transmits a SYN-ACK packet 1124 to the TCP client 1110 as part of the TCP handshake 1150. The SYN-ACK packet 1124 appears to be from the TCP origin server 1125 (e.g., it includes as its source IP address the IP address of the TCP origin server 1125 which was the destination IP address in the SYN packet 1120). Thus, it appears to the TCP client 1110 as if the TCP origin server 1125 transmitted the SYN-ACK packet 1124. The SYN-ACK packet 1124 includes a TFO cookie (TFO_cookie_1) set by the TCP intermediate device 1115. The TFO cookie may be unique and based on the connecting TCP client 1110. The TFO cookie may also be stored in association with the TCP origin server 1125 (e.g., as identified by the destination IP address of the SYN packet 1120). In response to the SYN-ACK packet 1124, the TCP intermediate device 1115 receives the ACK packet 1126 from the TCP client 1110 at operation 4. The ACK packet 1126 is the last packet of the three-way TCP handshake 1150. After the ACK packet 1126 is processed, the TCP connection between the TCP client 1110 and the TCP intermediate device 1115 is considered established.

In the example of FIG. 11, the TCP origin server 1125 supports TFO. In response to the SYN packet 1122, the TCP intermediate device receives the SYN-ACK packet 1128 from the TCP origin server 1125 at operation 5. The SYN-ACK packet 1128 includes a TFO cookie (TFO_cookie_2) set by the TCP origin server 1125. The TCP intermediate device 1115 may store the TFO cookie received from the TCP origin server 1125 for future use. In response to the SYN-ACK packet 1128, the TCP intermediate device 1115 transmits the ACK packet 1130 to the TCP origin server 1125 at operation 6. The ACK packet 1130 is the final packet in the three-way TCP handshake 1155. Thus, after receiving and processing the ACK packet 1130, a second TCP connection is established between the TCP intermediate device 1115 and the TCP origin server 1125.

Although FIG. 11 illustrates the packets being sent and received in a particular order, the packets may be sent and received by the TCP intermediate device 1115 in a different order while not waiting for the first TCP connection between the TCP client 1110 and the TCP intermediate device 1115 to complete. For instance, the TCP intermediate device 1115 may transmit the SYN-ACK packet 1124 before transmitting the SYN packet 1122. As another example, the TCP intermediate device 1115 may receive the SYN-ACK packet 1128 prior to receiving the ACK packet 1126.

Because the TCP intermediate device 1115 does not wait until the first TCP connection with the TCP client is complete before initiating the second TCP connection with the TCP origin server, the second TCP connection is completed faster than in conventional implementations which may improve the time to first byte (TTFB).

Sometime later, the TCP connection between the TCP client 1110 and the TCP intermediate device 1115 ends. Since the TCP client 1110 believes that the TCP origin server 1125 supports TFO, the next time the TCP client 1110 attempts to the connect to the TCP origin server 1125, it should indicate TFO with the identifier it was previously given. Thus, at operation 7, the TCP intermediate device 1115 receives the SYN packet 1132 from the TCP client 1110. The SYN packet 1132 includes the TFO cookie set by the TCP intermediate device 1115 included in operation 3 (TFO_Cookie_1). The SYN packet 1132 also includes a payload of data.

The intermediate device 1115 validates the TFO cookie included in the SYN packet 1132 at operation 8. The intermediate device 1115 verifies that the TFO cookie included in the SYN packet 1132 is valid. For instance, the TCP intermediate device 1115 may generate a TFO value based on the connecting TCP client 1110 (e.g., based on one or more attributes of the connecting TCP client 1110) and compare the two values. If the values are the same, the TFO cookie is valid. The intermediate device 1115 also determines that the TCP origin server 1125 supports TFO and accesses the stored TFO cookie it received from the TCP origin server 1125 at operation 5. At operation 9, the TCP intermediate device 1115 modifies the SYN packet 1132 to swap the TFO cookie included in the SYN packet 1132 with the TFO cookie received from the TCP origin server 1125 in operation 5. Thus, at operation 10, the TCP intermediate device 1115 transmits the SYN packet 1134 to the TCP origin server 1125 that includes the TFO cookie received from the TCP origin server 1125 (TFO_Cookie_2) instead of the TFO cookie received from the TCP client 1110. The SYN packet 1134 also includes the payload of data received from the TCP client 1110 in operation 7.

FIG. 12 is a flow diagram that illustrates implementing a TCP Fast Open (TFO) connection between a TCP client and a TCP origin server according to an embodiment. The operations of FIG. 12 will be described with respect to the exemplary embodiment of FIG. 11. However, the operations of FIG. 12 can be performed by embodiments other than those discussed with reference to FIG. 11, and the embodiments discussed with reference to FIG. 11 can perform operations different than those discussed with reference to FIG. 12.

In the example of FIG. 12, the initial connection is established in a similar way as FIG. 1 where the intermediate device 1115 opportunistically initiates a TCP connection with the TCP origin server 1125 without waiting for the completion of the TCP handshake between the TCP client 1110 and the TCP intermediate device 1115.

At operation 1210, the TCP intermediate device1115 receives a first SYN packet from the TCP client 1110. The first SYN packet is a first initial message to establish a first TCP connection between the TCP client 1110 and the TCP origin server 1125. The first SYN packet is addressed to the TCP origin server 1125. The TCP intermediate device 1115 splits the first TCP connection into two connections; a second connection between the TCP client 1110 and the TCP intermediate device 1115, and a third connection between the TCP intermediate device 1115 and the TCP origin server 1125. The first SYN packet includes an indication that it supports TFO. For instance, the first SYN packet may include a fast open cookie that has no value or a null value for the client to indicate to the server that it supports TFO.

Next, at operation 1215, prior to the second TCP connection between being fully established (e.g., prior to the three-way handshake between the TCP client 1110 and the TCP intermediate device 1115 being complete), the TCP intermediate device 1115 transmits a second SYN packet to the TCP origin server 1125. The second SYN packet is a second initial message to establish a third TCP connection between the TCP intermediate device 1115 and the TCP origin server 1125. The second SYN packet includes an indication that TFO is supported. For instance, the second SYN packet may include a fast open cookie that has no value or a null value.

Prior to operation 1215, the TCP intermediate device 1115 may determine that the first SYN packet is addressed to the TCP origin server 1125. Prior to operation 1215, the TCP intermediate device 1115 may determine that the first SYN packet is received on a trusted interface or authenticated IP tunnel. If it was not received on a trusted interface or authenticated IP tunnel, the TCP intermediate device 1115 may not perform the concurrent TCP connection establishment. Prior to operation 1225, the TCP intermediate device 1115 may determine that a number of number of TCP connection initiations received from the TCP client but a connection is not established does not exceed a threshold; if it exceeded the threshold, the TCP intermediate device 1115 may not perform the concurrent TCP connection. Prior to operation 1225, the TCP intermediate device 1115 may determine that a number of TCP connection initiations to the TCP origin server where a TCP connection is not established does not exceed a threshold; if it exceeded the threshold, the TCP intermediate device 1115 may not perform the concurrent TCP connection.

At operation 1220, the TCP intermediate device 1115 transmits a first SYN-ACK packet to the TCP client 1110 as part of establishing the second TCP connection between the TCP client 1110 and the TCP intermediate device 1115. The SYN-ACK packet appears to be from the TCP origin server 1125 (e.g., it includes as its source IP address the IP address of the TCP origin server 1125 which was the destination IP address in the SYN packet received from the TCP client 1110). Thus, it appears to the TCP client 1110 as if the TCP origin server 1125 transmitted the first SYN-ACK packet. The first SYN-ACK packet includes a first TFO cookie that is set by the TCP intermediate device 1115. The first TFO cookie may be unique and based on the connecting TCP client 710. The TFO cookie may also be stored in association with the TCP origin server 725 (e.g., as identified by the destination IP address of the SYN packet 720).

Next, at operation 1225, the TCP intermediate device 1115 receives a first ACK packet from the TCP client 1110 as part of establishing the second TCP connection between the TCP client 1110 and the TCP intermediate device 1115. The first ACK packet is the final packet in the three-way TCP handshake to establish the second TCP connection. Thus, the second TCP connection is established responsive to processing the first ACK packet from the TCP client 1110.

Next, at operation 1230, the TCP intermediate device 1115 receives a second SYN-ACK packet from the TCP origin server 1125 as part of establishing the third TCP connection between the TCP intermediate device 1115 and the TCP origin server 1125. In the example of FIG. 11 and FIG. 12, the TCP origin server 1125 supports TFO. Thus, the second SYN-ACK packet includes a second TFO cookie set by the TCP origin server 1125. The TCP intermediate device 1115 may store the TFO cookie received from the TCP origin server 1125 for future use.

Next, at operation 1235, the TCP intermediate device 1115 transmits a second ACK packet to the TCP origin server 1125 as part of establishing the third TCP connection. The second ACK packet is the final packet in the three-way TCP handshake to establish the third TCP connection. Thus, the third TCP connection is established response to processing second ACK packet.

Although FIG. 12 illustrates the packets being sent and received in a particular order, the packets may be sent and received by the TCP intermediate device 1115 in a different order while not waiting for the first TCP connection between the TCP client 1110 and the TCP intermediate device 1115 to complete. For instance, the TCP intermediate device 1115 may transmit the first SYN-ACK packet of operation 1220 before transmitting the second SYN packet of operation 1215. As another example, the TCP intermediate device 1115 may receive the second SYN-ACK packet of operation 1030 prior to receiving the first ACK packet of operation 1225.

Sometime later, the TCP connection between the TCP client 1110 and the TCP intermediate device 1115 ends. Since the TCP client 1110 believes that the TCP origin server 1125 supports TFO, the next time the TCP client 1110 attempts to the connect to the TCP origin server 1125, it should indicate TFO with the identifier it was previously given. Thus, at operation 1240, the TCP intermediate device 1115 receives a third SYN packet from the TCP client 1110, the third SYN packet including the TFO cookie set by the TCP intermediate device 515 and included in the first SYN-ACK packet. The third SYN packet also includes a payload of data.

Next, at operation 1245, the intermediate device 1115 validates the TFO cookie included in the third SYN packet. The intermediate device 1115 verifies that the TFO cookie included in the SYN packet is valid. For instance, the TCP intermediate device 1115 may generate a TFO value based on the connecting TCP client 1110 (e.g., based on one or more attributes of the connecting TCP client 1110) and compare the two values. If the values are the same, the TFO cookie is valid. The intermediate device 1115 may also determine that the TCP origin server 525 supports TFO, by, for example, accessing the stored information that indicates that the TCP origin server 1125 supports TFO. The intermediate device 1115 also accesses the stored TFO cookie it received from the TCP origin server 1125 at operation 1230.

At operation 1250, the TCP intermediate device 1115 modifies the third SYN packet to swap the TFO cookie included in the third SYN packet with the second TFO cookie received from the TCP origin server 1125 in the second SYN-ACK packet in operation 1230.

Next, at operation 1255, the TCP intermediate device 1115 transmits a fourth SYN packet to the TCP origin server 1125 that includes the second TFO cookie received from the TCP origin server 1125 (TFO_Cookie_2) instead of the TFO cookie received from the TCP client 1110. The fourth SYN packet also includes the payload of data received from the TCP client 1110 in the third SYN packet received in operation 1240.

Figure 13:
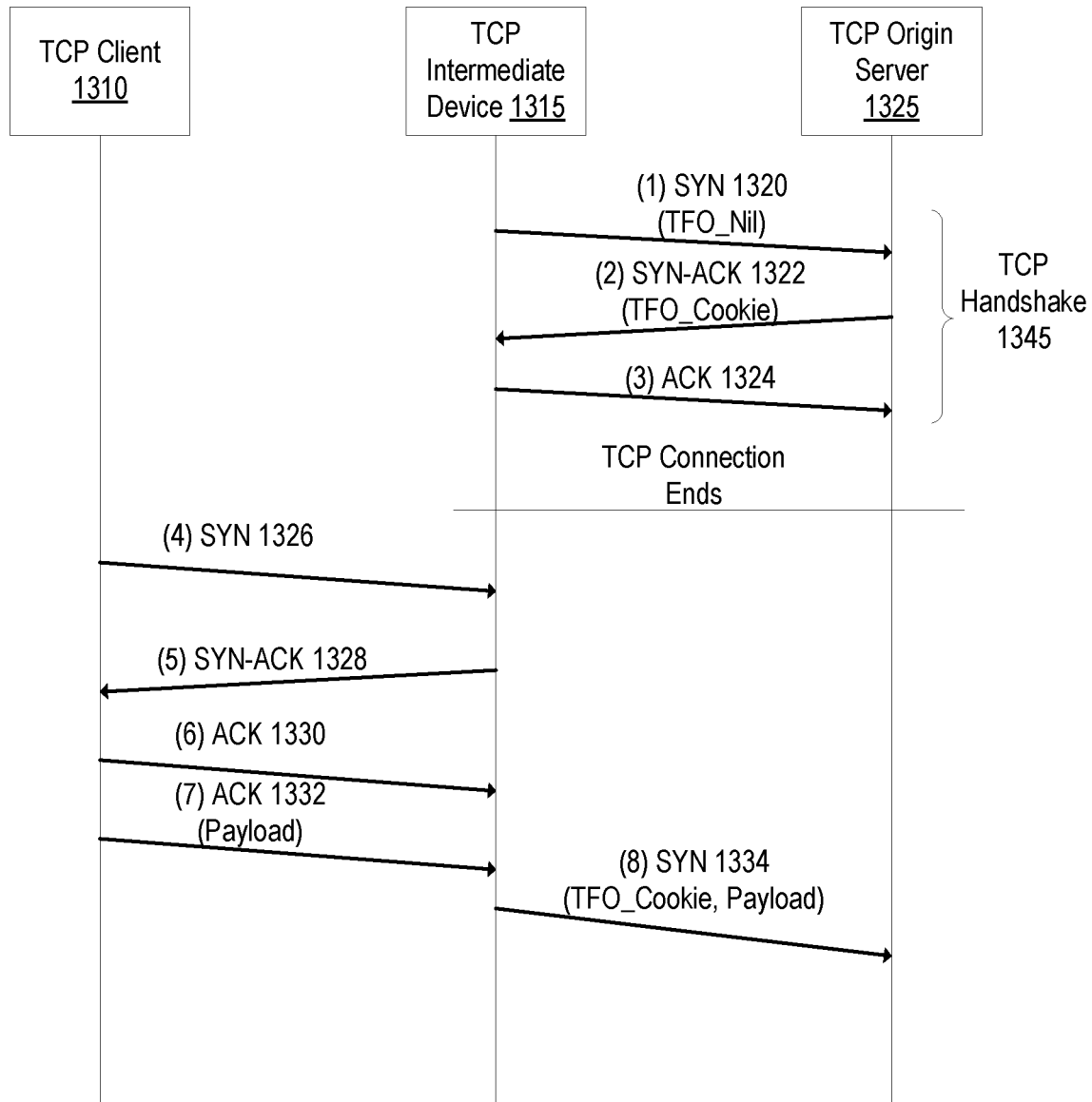
FIG. 13 is a sequence diagram that illustrates implementing a TCP Fast Open (TFO) connection without client support according to an embodiment.

FIG. 13 is a sequence diagram that illustrates implementing a TCP Fast Open (TFO) connection without client support according to an embodiment. The sequence diagram of FIG. 13 includes the TCP client 1310, the TCP intermediate device 1315, and the TCP origin server 1325. The TCP client 1310 may be any client network application that initiates a TCP connection with a server. For example, the client network application may be an Internet browser executing on a client device, a native application executing on a client device, or any other application that implements TCP. The TCP origin server 1325 may be a network server and may or may not be an origin server that maintains web pages.

In the example of FIG. 13, the TCP client 1310 does not support TFO but the TCP intermediate device 1315 and the TCP origin server 1325 both support TFO. The TCP intermediate device 1315 and the TCP origin server 1325 establish a first TCP connection where a TFO cookie is set by the TCP origin server 1325. After a TCP connection is established between the TCP client 1310 and the TCP intermediate device 1315 and the TCP intermediate device 1315 receives a payload of data from the TCP client 1310, the TCP intermediate device 1315 transmits a SYN packet to the TCP origin server 1325 that includes the TFO cookie set by the TCP origin server 1325 and the payload of data.

At operation 1, the TCP intermediate device 1315 transmits a SYN packet 1320 to the TCP origin server 1325 to initiate the TCP handshake 1345. The SYN packet 1320 includes an indication that TFO is supported. For instance, the SYN packet 1320 may include a fast open cookie that has no value or a null value.

In the example of FIG. 13, the TCP origin server 1325 supports TFO. In response to the SYN packet 1320, the TCP intermediate device 1315 receives the SYN-ACK packet 1322 from the TCP origin server 1325 at operation 2. The SYN-ACK packet 1322 includes a TFO cookie (TFO_cookie) set by the TCP origin server 1325. The TCP intermediate device 1315 may store the TFO cookie received from the TCP origin server 1325 for future use. In response to the SYN-ACK packet 1322, the TCP intermediate device 1315 transmits the ACK packet 1324 to the TCP origin server 1325 at operation 3. The ACK packet 1324 is the final packet in the three-way TCP handshake 1345. Thus, after receiving and processing the ACK packet 1324, a first TCP connection is established between the TCP intermediate device 1315 and the TCP origin server 1325. Sometime later, the TCP connection between the TCP intermediate device 1315 and the TCP origin server 1325 ends.

The TCP connection between the TCP intermediate device 1115 and the TCP origin server 1125 may be established as a result of different actions that are not shown in FIG. 11. For instance, this TCP connection may be established responsive to the TCP client 510 requesting an initial TCP connection with the TCP origin server 525. This initial TCP connection can be established using the opportunistic connection described herein in a similar way as FIG. 1 or FIG. 11. Alternatively, this initial TCP connection can be established using the conventional three-way handshake.

At operation 4, the TCP intermediate device 1315 receives the SYN packet 1326 from the TCP client 1310. The SYN packet 1326 does not include an indication that the TCP client 1310 supports TFO. The SYN packet 1326 is a first initial message to establish a first TCP connection between the TCP client 1310 and the TCP origin server 1325. The SYN packet 1326 is destined for the TCP origin server 1325 and may include as its destination IP address an IP address of the TCP origin server 1325.

Responsive to this packet, the TCP intermediate device 1315 transmits the SYN-ACK packet 1328 to the TCP client 1310 at operation 5. The SYN-ACK packet 1328 may appear to be from the TCP origin server 1325 (e.g., it may include as its source IP address the IP address of the TCP origin server 1325 which was the destination IP address in the SYN packet 1326). Thus, it may appear to the TCP client 1310 as if the TCP origin server 1325 transmitted the SYN-ACK packet 1328. In response to the SYN-ACK packet 1328, the TCP intermediate device 1315 receives the ACK packet 1330 from the TCP client 1310 at operation 6. The ACK packet 1330 is the last packet of the three-way TCP handshake. After the ACK packet 1330 is processed, the TCP connection between the TCP client 1310 and the TCP intermediate device 1315 is considered established. Then, at operation 7, the TCP intermediate device 1315 receives the ACK packet 1332 from the TCP client 1310 that includes a payload of data.

Since the TCP origin server 1325 supports TFO, the TCP intermediate device 1315 transmits the SYN packet 1334 to the TCP origin server 1325 that includes the TFO cookie received from the TCP origin server 1325 (TFO_Cookie) and the payload of data received from the TCP client 1310. Thus, FIG. 13 shows an example for supporting TFO without any client support.

Figure 14:
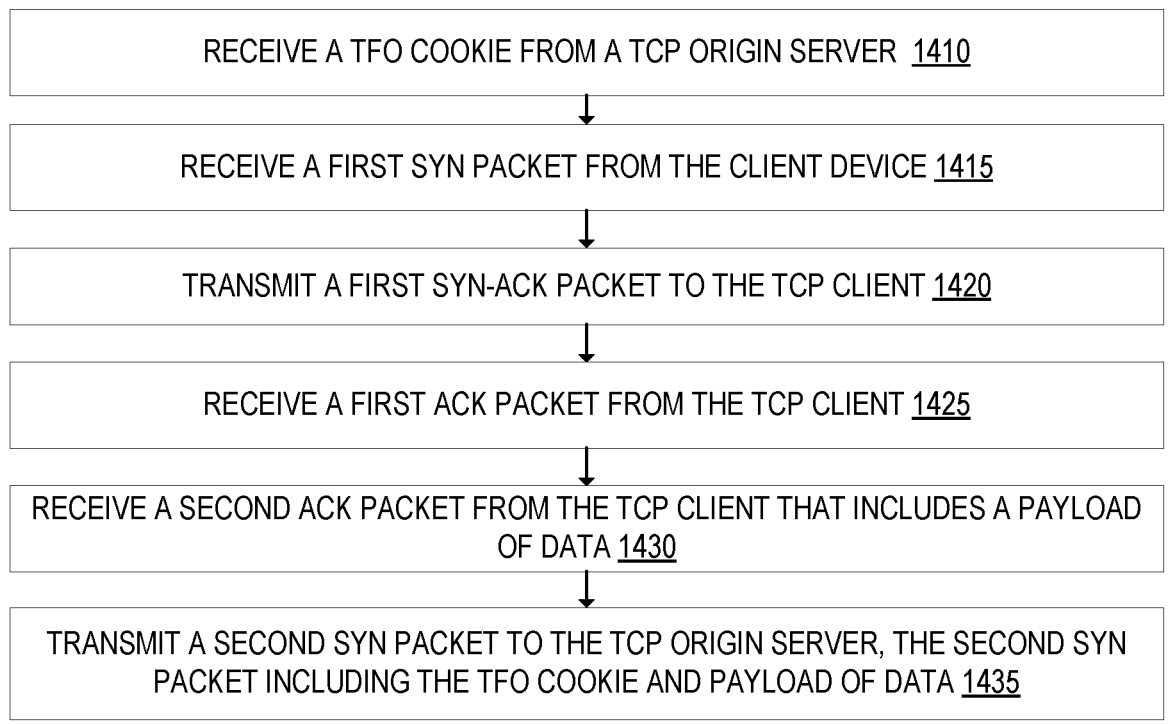
FIG. 14 is a flow diagram that illustrates exemplary operations for implementing a TCP Fast Open (TFO) connection without client support according to an embodiment.

FIG. 14 is a flow diagram that illustrates exemplary operations for implementing a TCP Fast Open (TFO) connection without client support according to an embodiment. The operations of FIG. 14 will be described with respect to the exemplary embodiment of FIG. 13. However, the operations of FIG. 14 can be performed by embodiments other than those discussed with reference to FIG. 13, and the embodiments discussed with reference to FIG. 13 can perform operations different than those discussed with reference to FIG. 14.

At operation 1410, the TCP intermediate device 1315 receives a TFO cookie from the TCP origin server 1325. The TFO cookie may be received in a SYN-ACK packet received from the TCP origin server 1325 where the SYN-ACK packet is part of a TCP handshake between the TCP intermediate device 1315 and the TCP origin server 1325. The TCP intermediate device 1315 stores the TFO cookie for later use.

At operation 1415, the TCP intermediate device 1315 receives a first SYN packet from the TCP client 1310. The first SYN packet is a first initial message to establish a TCP connection between the TCP client 1310 and the TCP origin server 1325. The first SYN packet may be destined for the TCP origin server 1325 and may include as its destination IP address an IP address of the TCP origin server 1325 and intercepted by the TCP intermediate device 1315. Because the TCP client 1310 does not support TFO, the first SYN packet does not include an indication of TFO support.

Next, at operation 1420, the TCP intermediate device 1315 transmits a SYN-ACK packet to the TCP client 1310. The SYN-ACK packet may appear to be from the TCP origin server 1325 (e.g., it may include as its source IP address the IP address of the TCP origin server 1325 which was the destination IP address in the first SYN packet). Thus, it may appear to the TCP client 1310 as if the TCP origin server 1325 transmitted the SYN-ACK packet. In response to the SYN-ACK packet, at operation 1425, the TCP intermediate device 1315 receives a first ACK packet from the TCP client 1310. The first ACK packet is the last packet of the three-way TCP handshake. Then, at operation 1430, the TCP intermediate device receives a second ACK packet from the TCP client 1310 that includes a payload of data.

Since the TCP origin server 1325 supports TFO, the TCP intermediate device 1315 transmits a second SYN packet to the TCP origin server 1325 that includes the TFO cookie received from the TCP origin server 1325 and the payload of data received from the TCP client 1310 at operation 1435.

Figure 15:
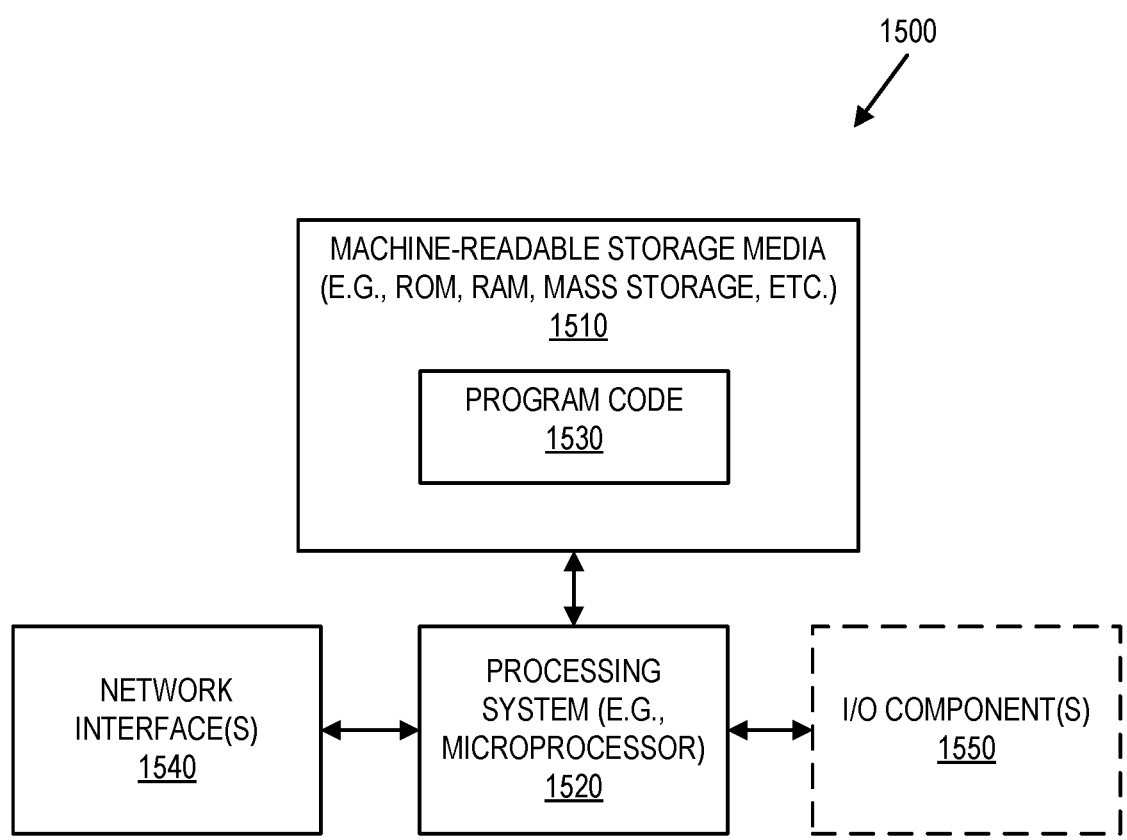
FIG. 15 illustrates a block diagram for an exemplary data processing system that may be used in some embodiments.

FIG. 15 illustrates a block diagram for an exemplary data processing system 1500 that may be used in some embodiments. One or more such data processing systems 1500 may be utilized to implement the embodiments and operations described with respect to the TCP client, TCP intermediate device, and/or TCP server.

The data processing system 1500 is an electronic device that stores and transmits (internally and/or with other electronic devices over a network) code (which is composed of software instructions and which is sometimes referred to as computer program code or a computer program) and/or data using machine-readable media (also called computer-readable media), such as machine-readable storage media 1510 (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals), which is coupled to the processing system 1520. The processing system 1520 may be one or more processors and/or connected system components such as multiple connected chips. The depicted machine-readable storage media 1510 may store program code 1530 that, when executed by the processor(s) 1520, causes the data processing system 1500 to perform the operations described herein.

The data processing system 1500 also includes one or more network interfaces 1540 (e.g., a wired and/or wireless interfaces) that allows the data processing system 1500 to transmit data and receive data from other computing devices, typically across one or more networks (e.g., Local Area Networks (LANs), the Internet, etc.). The data processing system 1500 may also include one or more input or output ("I/O") components 1550 such as a mouse, keypad, keyboard, a touch panel or a multi-touch input panel, camera, frame grabber, optical scanner, an audio input/output subsystem (which may include a microphone and/or a speaker), other known I/O devices or a combination of such I/O devices. Additional components, not shown, may also be part of the system 1500, and, in certain embodiments, fewer components than that shown may be part of the system 1500.

The techniques shown in the figures can be implemented using code and data stored and executed on one or more computing devices (e.g., client device, compute server, DNS server, control server, origin server, etc.). Such computing devices store and communicate (internally and/or with other computing devices over a network) code and data using machine-readable media, such as non-transitory machine-readable storage media (e.g., magnetic disks; optical disks; random access memory; read only memory; flash memory devices; phase-change memory) and machine-readable communication media (e.g., electrical, optical, acoustical or other form of propagated signals—such as carrier waves, infrared signals, digital signals, etc.). In addition, such computing devices typically include a set of one or more processors coupled to one or more other components, such as one or more storage devices, user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given computing device typically stores code and/or data for execution on the set of one or more processors of that computing device. Of course, one or more parts of an embodiment of the invention may be implemented using different combinations of software, firmware, and/or hardware.

In the preceding description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method performed by a Transmission Control Protocol (TCP) intermediate device, comprising:
    receiving, from a TCP client, a first SYN packet that is destined for a TCP origin server,
        wherein the first SYN packet indicates support for TCP fast open (TFO);
    transmitting a first SYN-ACK packet to the TCP client that includes a TFO cookie set by the TCP intermediate device;
    receiving a first ACK packet from the TCP client;
    transmitting a second SYN packet to the TCP origin server;
    receiving, from the TCP origin server, a second SYN-ACK packet, wherein the second SYN-ACK packet does not indicate support for TFO;
    transmitting a second ACK packet to the TCP origin server;
    receiving, from the TCP client, a third ACK packet that includes a first payload of data;
    transmitting, to the TCP origin server, a fourth ACK packet that includes the first payload of data;
    receiving, from the TCP client; a third SYN packet that includes the TFO cookie set by the TCP intermediate device and a second payload of data;
    validating the TFO cookie;
    responsive to validating the TFO cookie, establishing a TCP connection with the TCP origin server including:
        transmitting a fourth SYN packet to the TCP origin server,
        receiving, from the TCP origin server, a third SYN-ACK packet responsive to the fourth SYN packet, and
        transmitting a fifth ACK packet to the TCP origin server; and
    transmitting a sixth ACK packet to the TCP origin server that includes the second payload of data.

2. The method of claim 1, wherein the TCP intermediate device is a transparent proxy.

3. The method of claim 1, wherein the first SYN packet and the second SYN packet are equivalent.

4. The method of claim 1, wherein the first SYN-ACK packet is transmitted after the second SYN-ACK packet is received.

5. The method of claim 1, wherein the first SYN-ACK packet is modified from the second SYN-ACK packet to include the TFO cookie.

6. The method of claim 1, wherein a destination IP address of the first SYN packet is an IP address of the TCP origin server, wherein a source IP address of the first SYN-ACK packet is the IP address of the TCP origin server.

7. A non-transitory machine-readable storage medium that provides instructions that, if executed by a processor, will cause said processor to perform operations including:
    receiving, from a TCP client, a first SYN packet that is destined for a TCP origin server,
        wherein the first SYN packet indicates support for TCP fast open (TFO);
    transmitting a first SYN-ACK packet to the TCP client that includes a TFO cookie set by a TCP intermediate device;
    receiving a first ACK packet from the TCP client;
    transmitting a second SYN packet to the TCP origin server;
    receiving, from the TCP origin server, a second SYN-ACK packet, wherein the second SYN-ACK packet does not indicate support for TFO;
    transmitting a second ACK packet to the TCP origin server;
    receiving, from the TCP client, a third ACK packet that includes a first payload of data;
    transmitting, to the TCP origin server, a fourth ACK packet that includes the first payload of data;
    receiving, from the TCP client; a third SYN packet that includes the TFO cookie set by the TCP intermediate device and a second payload of data;
    validating the TFO cookie;
    responsive to validating the TFO cookie, establishing a TCP connection with the TCP origin server including:
        transmitting a fourth SYN packet to the TCP origin server,
        receiving, from the TCP origin server, a third SYN-ACK packet responsive to the fourth SYN packet, and
        transmitting a fifth ACK packet to the TCP origin server; and
    transmitting a sixth ACK packet to the TCP origin server that includes the second payload of data.

8. The non-transitory machine-readable storage medium of claim 7, wherein the TCP intermediate device is a transparent proxy.

9. The non-transitory machine-readable storage medium of claim 7, wherein the first SYN packet and the second SYN packet are equivalent.

10. The non-transitory machine-readable storage medium of claim 7, wherein the first SYN-ACK packet is transmitted after the second SYN-ACK packet is received.

11. The non-transitory machine-readable storage medium of claim 7, wherein the first SYN-ACK packet is modified from the second SYN-ACK packet to include the TFO cookie.

12. The non-transitory machine-readable storage medium of claim 7, wherein a destination IP address of the first SYN packet is an IP address of the TCP origin server, wherein a source IP address of the first SYN-ACK packet is the IP address of the TCP origin server.

13. An apparatus, comprising:
a processor; and
a non-transitory machine-readable storage medium that provides instructions that, if executed by the processor, will cause the processor to carry out operations including:
receive, from a TCP client, a first SYN packet that is destined for a TCP origin server, wherein the first SYN packet is to indicate support for TCP fast open (TFO);
transmit a first SYN-ACK packet to the TCP client that includes a TFO cookie set by a TCP intermediate device;
receive a first ACK packet from the TCP client;
transmit a second SYN packet to the TCP origin server;
receive, from the TCP origin server, a second SYN-ACK packet that does not indicate support for TFO;
transmit a second ACK packet to the TCP origin server;
receive, from the TCP client, a third ACK packet that includes a first payload of data;
transmit, to the TCP origin server, a fourth ACK packet that includes the first payload of data;
receive, from the TCP client; a third SYN packet that includes the TFO cookie set by the TCP intermediate device and a second payload of data;
validate the TFO cookie;
responsive to validation of the TFO cookie, establish a TCP connection with the TCP origin server including:
transmit a fourth SYN packet to the TCP origin server,
receive, from the TCP origin server, a third SYN-ACK packet responsive to the fourth SYN packet, and
transmit a fifth ACK packet to the TCP origin server; and
transmit a sixth ACK packet to the TCP origin server that includes the second payload of data.

14. The apparatus of claim 13, wherein the TCP intermediate device is a transparent proxy.

15. The apparatus of claim 13, wherein the first SYN packet and the second SYN packet are equivalent.

16. The apparatus of claim 13, wherein the first SYN-ACK packet is transmitted after the second SYN-ACK packet is received.

17. The apparatus of claim 13, wherein the first SYN-ACK packet is to be modified from the second SYN-ACK packet to include the TFO cookie.

18. The apparatus of claim 13, wherein a destination IP address of the first SYN packet is an IP address of the TCP origin server, wherein a source IP address of the first SYN-ACK packet is the IP address of the TCP origin server.

* * * * *